United States Patent
Monzyk et al.

(10) Patent No.: US 8,722,147 B2
(45) Date of Patent: May 13, 2014

(54) CORROSION RESISTANT PRIMER COATING

(75) Inventors: Bruce F. Monzyk, Delaware, OH (US);
Jerad A. Ford, Kuala Lumpur (MY);
John T. Stropki, Westerville, OH (US);
David N. Clark, Los Lunas, NM (US);
Vinay V. Gadkari, Powell, OH (US);
Katherine P. Mitchell, Pickerington, OH (US)

(73) Assignee: Battelle Memorial Institute, Columbus, OH (US)

( * ) Notice: Subject to any disclaimer, the term of this patent is extended or adjusted under 35 U.S.C. 154(b) by 75 days.

(21) Appl. No.: 13/124,702

(22) PCT Filed: Oct. 19, 2009

(86) PCT No.: PCT/US2009/061204
§ 371 (c)(1),
(2), (4) Date: Apr. 18, 2011

(87) PCT Pub. No.: WO2010/045657
PCT Pub. Date: Apr. 22, 2010

(65) Prior Publication Data
US 2011/0200754 A1     Aug. 18, 2011

Related U.S. Application Data

(60) Provisional application No. 61/106,321, filed on Oct. 17, 2008.

(51) Int. Cl.
C09K 3/00      (2006.01)
C23C 8/00      (2006.01)
B05D 3/12      (2006.01)

(52) U.S. Cl.
USPC ............... 427/327; 252/389.51; 252/389.52; 252/389.53; 148/240; 523/210

(58) Field of Classification Search
USPC ............... 523/210; 423/140, 594.1; 427/327; 252/389.53, 389.52, 389.51
See application file for complete search history.

(56) References Cited

U.S. PATENT DOCUMENTS

| | | | |
|---|---|---|---|
| 3,372,125 A | 3/1968 | Hill | |
| 3,904,421 A | 9/1975 | Shimizu et al. | |
| 4,101,497 A * | 7/1978 | Charves et al. | 523/454 |
| 4,156,613 A | 5/1979 | Hund et al. | |
| 4,225,352 A | 9/1980 | Makino et al. | |
| 4,243,494 A | 1/1981 | Riggs, Jr. et al. | |
| 4,256,551 A | 3/1981 | Cliff et al. | |
| 4,606,843 A | 8/1986 | Kaczur | |
| 4,614,607 A * | 9/1986 | Loch | 510/257 |
| 4,705,726 A | 11/1987 | Shindou et al. | |
| 5,202,108 A * | 4/1993 | Deininger | 423/594.12 |
| 5,284,642 A | 2/1994 | Evrard et al. | |
| 5,416,150 A | 5/1995 | Boeck | |
| 5,607,504 A | 3/1997 | Schmid et al. | |
| 6,080,288 A | 6/2000 | Schwartz et al. | |
| 6,267,896 B1 | 7/2001 | Patterson et al. | |
| 6,471,788 B1 | 10/2002 | Minevski et al. | |
| 6,566,574 B1 | 5/2003 | Tadros et al. | |
| 6,576,346 B1 | 6/2003 | Ravenscroft et al. | |
| 6,723,890 B2 | 4/2004 | Tucker et al. | |
| 6,837,984 B2 | 1/2005 | Wang | |

(Continued)

FOREIGN PATENT DOCUMENTS

| | | |
|---|---|---|
| CN | 1524595 | 9/2004 |
| DE | 553004 | 5/1943 |
| EP | 166825 | 1/2002 |
| FR | 2805162 | 8/2001 |
| JP | 46-34316 | 10/1971 |
| JP | 59139314 | 8/1984 |
| JP | 61053398 | 3/1986 |
| JP | 62007596 | 1/1987 |
| JP | 62091225 | 4/1987 |
| JP | 62292492 | 12/1987 |

(Continued)

OTHER PUBLICATIONS

Audette, R.J., Quail, J.W.: "Potassium, Rubidium, Cesium, and Barium Ferrates(VI). Preparations, Infrared Spectra, and Magnetic Susceptibilities". Inorganic Chemistry, [Online], vol. 11, No. 8, Aug. 1972, XP002569971 DOI: 10.1021/ic50114a034 [retrieved on Feb. 23, 2010].

Bouzek, K., Lipovska, M., Schmidt, M., Rousar, I., Wragg, A.A.: "Electrochemical Production of Ferrate(VI) Using Sinusoidal Alternating Current Superimposed on Direct Current: Grey and White Cast Iron Electrodes". Electrochimica Acta, vol. 44 (1998) pp. 547-557.

(Continued)

Primary Examiner — Hannah Pak
(74) Attorney, Agent, or Firm — Yimei C. Hammond; Kremblas & Foster

(57) ABSTRACT

A corrosion resistant primer coating comprises one or more corrosion inhibiting additives; and one or more nonaqueous resins, and the method of making and using the primer coating. The corrosion inhibiting additive comprises metal ferrate (IV) compounds, metal ferrate(V) compounds, metal ferrate (VI) compounds, or a mixture thereof (collectively called the ferrate compound). The ferrate compound has a low solubility in water in the range of about 0.001 ppm to about 2000 ppm at a temperature in the range of about 0° C. to 71° C.

A method of making the metal-1 ferrate compound suitable for the corrosion resistant primer coating comprises steps of (a) dissolving a highly soluble metal-1 salt in water, (b) dissolving and mixing an alkali metal ferrate compound and a metal-2 hydroxide in water, (c) adding the solution of step (b) to the solution of step (a) to form a preproduct, wherein the preproduct comprises the metal-1 ferrate compound; (d) filtering and washing the preproduct with one or more solvents to obtain the metal-1 ferrate compound; and (e) drying the metal ferrate compound in a low moisture environment to obtain the dried metal-1 ferrate compound; wherein the metal-1 ion and the metal-2 ion are the same or are different from each other.

31 Claims, No Drawings

(56) References Cited

U.S. PATENT DOCUMENTS

| | | | |
|---|---|---|---|
| 6,899,769 | B2 | 5/2005 | Ravenscroft et al. |
| 6,899,956 | B2 | 5/2005 | Block et al. |
| 7,045,024 | B2 * | 5/2006 | Minevski et al. ............ 148/273 |
| 7,045,051 | B2 | 5/2006 | Minevski et al. |
| 7,291,217 | B2 | 11/2007 | Phelps et al. |
| 7,347,893 | B2 | 3/2008 | Low |
| 7,387,671 | B2 | 6/2008 | Meisen et al. |
| 7,387,672 | B2 | 6/2008 | Friedrich |
| 7,410,536 | B2 | 8/2008 | Friedrich et al. |
| 7,422,793 | B2 | 9/2008 | Phelps et al. |
| 2002/0098989 | A1 | 7/2002 | Heimann et al. |
| 2003/0042134 | A1 | 3/2003 | Tremblay et al. |
| 2003/0055245 | A1 | 3/2003 | Tseng et al. |
| 2003/0146169 | A1 | 8/2003 | Ciampi et al. |
| 2003/0159942 | A1 | 8/2003 | Minevski et al. |
| 2004/0104377 | A1 | 6/2004 | Phelps et al. |
| 2004/0216637 | A1 | 11/2004 | Buchheit et al. |
| 2005/0022810 | A1 | 2/2005 | Moore et al. |
| 2005/0049157 | A1 | 3/2005 | MacDonald et al. |
| 2005/0053543 | A1 | 3/2005 | Kneip et al. |
| 2005/0123743 | A1 | 6/2005 | Martinazzo |
| 2005/0152828 | A1 | 7/2005 | Aga et al. |
| 2006/0134339 | A1 | 6/2006 | Wang et al. |
| 2006/0162613 | A1 | 7/2006 | Rosenhahn et al. |
| 2008/0305341 | A1 | 12/2008 | Plieth et al. |
| 2009/0216060 | A1 | 8/2009 | Monzyk et al. |
| 2011/0017209 | A1 | 1/2011 | Monzyk |
| 2013/0034594 | A1 * | 2/2013 | Monzyk et al. ............... 424/411 |

FOREIGN PATENT DOCUMENTS

| | | |
|---|---|---|
| WO | 0121856 | 3/2001 |
| WO | 0182896 | 11/2001 |
| WO | 2005069892 | 8/2005 |
| WO | 2006015756 | 2/2006 |
| WO | 2007075153 | 7/2007 |
| WO | 2008112657 | 9/2008 |
| WO | 2009142823 | 11/2009 |
| WO | 2010045657 | 4/2010 |

OTHER PUBLICATIONS

Bouzek, K., Rousar, I.: "The Study of Electrochemical Preparation of Ferrate(VI) Using Alternating Current Superimposed on the Direct Current Frequency Dependence of Current Yields". Electrochimica Acta, vol. 38, No. 13, 1993, pp. 1717-1720.

Bouzek, K., Flower, L., Rousar, I., Wragg, A.A.: "Electrochemical Production of Ferrate(VI) Using Sinusoidal Alternating Current Superimposed on Direct Current. Pure Iron Electrode". Journal of Applied Electrochemistry, vol. 29, 1999, pp. 569-576.

Bouzek, K., et al. "Influence of Anode Material on Current Yields During Ferrate(VI) Production by Anodic Iron Dissolution Part I: Current Efficiency During Anodic Dissolution of Grey Cast Iron to Ferrate(VI) in Concentrated Alkali Hydroxide Solutions". Journal of Applied Electrochemistry, vol. 26, 1996, pp. 919-923.

Dean, John A. "Lange's Handbook of Chemistry". 15th edition, 1999, McGraw-Hill, New York, 8.104-8.111.

Delaude et al.: "A Novel Oxidizing Reagent Based on Potassium Ferrate(VI)". Journal of Organic Chemistry, vol. 61, 1996, pp. 6360-6370.

Grube, Von G., Gmelin, H.: "Effects of Superimposed Alternating Current on Anode Ferrate Formation". Zeitschrift fur Electrochemie, vol. 26, 1920, pp. 153-161.

He, W., Wang, J., Yang, C., and Zhang, J.: "The Rapid Electrochemical Preparation of Dissolved Ferrate(VI): Effects of Various Operating Parameters". Electrochimica Acta, vol. 51, 2006, pp. 1067-1973.

Hirota, N.: "Anticorrosion Paints". May 12, 1984, XP002569967, database accession No. 1972:476784.

Hives, J., Benova, M., Bouzek, K., Sitek, J., Sharma, V.K.: "The Cyclic Voltammetric Study of Ferrate(VI) Formation in a Molten Na/K hydroxide Mixture". Electrochimica Acta, vol. 54, 2008, pp. 203-208.

Kim, K.S., Chang, Y., Bae, S.K. and Hahn, C.S.: "Selective Oxidation of Allylic and Benzylic Alcohols Using Potassium Ferrate under Phase-Transfer Catalysis Condition". Synthesis, vol. 10, Oct. 1984, pp. 866-868. XP002438865.

Licht, Stuart, Naschitz, Vera, Wang, Baohui: "Rapid Chemical Synthesis of the Barium Ferrate Super-Iron Fe (VI) Compound, BaFeO4". Journal of Power Sources [Online] vol. 109, Jun. 15, 2002, pp. 67-70, XP002569968 DOI: doi:10.1016/S0378-7753 (02)00041-1 [retrieved on Feb. 23, 2010].

Macova, Z., Bouzek, K, Hives, J., Sharma, V.K., Terryn, R.J., Baum, J.C.: "Research Progress in the Electrochemical Synthesis of Ferrate(VI)". Electrochimica Acta, vol. 54, 2009, pp. 2673-2683.

Sharma, Virender K., "Potassium Ferrate(VI): An Environmentally Friendly Oxidant". Advances in Environmental Research 6 (2002) 143-156.

Yang, W., Zhou, Y., Wang, H. and Bi, D: "Studies on Influence of Various Experimental Conditions on Electrochemical Generation of Ferrate(VI) in NaOH—KOH mixed Electrolyte". Russian Journal of Electrochemistry, vol. 45, No. 7, 2009, pp. 795-799.

First Report mailed May 29, 2009, from Australian Intellectual Property Office, in an Australian patent No. 2005206927.

Notice of Allowance mailed Jun. 4, 2010, from Australian Intellectual Property Office, in an Australian patent No. 2005206927.

The First Office Action from the State Intellectual Property Office of the People's Republic of China mailed on Mar. 10, 2010, in the chinese patent application No. 200580002471.5.

The Second Office Action from the State Intellectual Property Office of the People's Republic of China mailed on Nov. 4, 2010, in the Chinese patent application No. 200580002471.5.

First Office action mailed on Sep. 10, 2010, in a co-pending US patent application publication No. 20090216060 published on Aug. 27, 2009.

Second Office action mailed on Jan. 12, 2011, in a co-pending patent application publication No. 20090216060 published on Aug. 27, 2009.

Communication from the European Patent Office mailed on Apr. 11, 2008, in a co-pending European Patent Application No. 05858701. 5-1218.

Communication from the European Patent Office mailed on Jun. 18, 2010, in a co-pending European Patent Application No. 0585701.5-1218.

Issuance Notice mailed on Nov. 16, 2010, in a co-pending European Patent Application No. 05858701.5-1218.

Written Opinion of the International Searching Authority for International Application Publication No. WO2007/075153 (Application No. PCT/US2005/04714), published on Jul. 5, 2007, Authorized Officer Dalkafouki, A.

International Search Report for International Application Publication No. WO2007/075153 (Application No. PCT/US2005/04714), published on Jul. 5, 2007, Authorized Officer Dalkafouki, A.

Written Opinion of the International Searching Authority for International Application Publication No. WO2008/112657 (Application No. PCT/US2008/056446), published on Sep. 18, 2008, Authorized Officer Pelli Wablat, B.

Written Opinion of the International Searching Authority for International Application Publication No. WO2010/045657 (Application No. PCT/US2009/061204), published on Apr. 22, 2010, Authorized Officer Schmitt, J.

Written Opinion of the International Searching Authority for International Application Publication No. WO2009/142823 (Application No. PCT/US2009/038472), published on Nov. 26, 2009, Authorized Officer Simin Baharlou.

Written Opinion of the International Searching Authority for International Application Publication No. WO2005/069892 (Application No. PCT/US2005/001402), published on Aug. 4, 2005, Authorized Officer Roy King.

Communication from the European Patent Office mailed on Mar. 31, 2011 in a co-pending European Patent Application No. 09751053.1.

* cited by examiner

CORROSION RESISTANT PRIMER COATING

FIELD OF THE INVENTION

The invention includes corrosion resistant primer coatings that are useful for corrosion prevention on metal surfaces or metal substrates in the aerospace industry, automotive industry, architectural industry, packaging industry, electronics industry, marine, fixed structures and infrastructure, vehicle conveyances, and production related metal structures.

BACKGROUND OF THE INVENTION

Metals or metal alloys are commonly used in aerospace, marine, auto, and many other applications. Generally, these metal or metal alloys need corrosion protection in order to effectively and safely repair aging equipment or structure. Conversion coatings and primers based on hexavalent chromium ("chromate" or "$Cr^{VI}$") have been mainstays in this effort because of their excellent corrosion inhibition, coating adhesion, and self-sealing attributes. However, all forms of hexavalent chromium are recognized by the United States National Institute of Environmental Health Sciences as a Group I known human carcinogen. Thus, hexavalent chromium is coming under increased federal and state environmental regulations. Moreover, commercial use of hexavalent chromium is being restricted by the Reduction of Hazardous Substances (RoHS) directive. This directive requires manufacturers to eliminate or minimize the use of cancer-causing hexavalent chromium in conversion coatings used to protect aluminum and steel surfaces from corrosion.

Considerable efforts were made to research alternatives to hexavalent chromate system, none of which do as good a job in corrosion resistance as chromium. Some examples of other metals that had been tried in these efforts are cerium, gallium, scandium, tellurium, titanium, vanadium, molybdenum, and magnesium.

Iron compounds in high oxidative states, also called ferrates or ferrate compounds (also denotes as ferrate(IV), ferrate(V), or ferrate(VI), are expected to have many surface finishing attributes. For example, ferrate can be safely applied at room temperature and is environmentally friendly. Ferrate does not produce hazardous wastes or leave toxic residuals. The environmental acceptability of ferrate has resulted in the launching of commercial ventures as a broad spectrum water purification reagent, including in large-scale potable water production.

At the same time, it has long been known that ferrates are powerful oxidants, and as such are incompatible with organic materials. As a powerful oxidant, ferrate is being researched for uses in disinfection, surface decontamination, waste water treatment, and in batteries. The literature also contains reports of the use of ferrate in certain organic oxidations, surface treatments, and blood clotting.

Moreover, an aqueous solution of ferrate anions can rapidly oxidize metal surfaces to form a very thin protective oxide layer of a conversion coating. Minevski et al. in U.S. Pat. No. 7,045,024 describes a process in which an aluminum surface is cleaned and then treated with a ferrate solution for a time ranging from about 1 second to about 5 minutes.

A conversion coating on a metal surface is normally formed using an aqueous solution of inorganic compounds, especially that of chromate or acidic phosphate. The conversion coating formulation solution must be applied to a cleaned and preferably deoxidized metal surface so that the oxidants, acids, or base, in the conversion coating solution can gain access to the metal surface and then react with the metal surface. The reaction between the metal ions on the metal surface and the conversation coating caused the conversation coating to etch into the metal surface and to form a very thin layer of protective oxide or phosphate film (about 0.001 to about 0.1 mil thickness).

In addition, the reaction with the metal ions uses up at least a portion, and usually most, of the oxidant(s) in the resulting protective film of conversion coating. More importantly, the protective oxide or phosphate film is very un-reactive and stable, and can provide good adhesion of primer added next. As such, the resulting protective oxide or phosphate film creates a barrier against invasion of moisture, oxygen, salts, acids, and other environmental factors, protecting the metal surface from flash or future rusting. The conversion coating can be made immediately before application and then usually applied on metal surfaces within a very short period of time. Therefore, the conversion coating can utilize the oxidation potential of the ferrate ions without having to worrying about the instability issues associated with the ferrate ions.

On the other hand, paints or primers generally require an extended time in processing, storage, and application process, which can last up to days, months or years. Then, the paint or primer can be directly applied to surfaces or after simple remixing of the formulation. However, a ferrate solution is unstable after a few minutes, making it unsuitable for any extended processing or application, such as paints or primers.

Moreover, such a ferrate solution would not be applicable in a primer coating because the ferrate would rapidly oxidize the organic components in the primer coating, such as resins, diluents, or other organic additives. Organic components are normally absent in a conversion coating and so this reactivity incompatibility issue does not arise in a ferrate conversation coating. For example, even in the presence of a phase transfer catalyst, ferrate has been reported to result in the oxidation of certain organic compounds. Song et al., in Huaxue Tongbao 69(3), 220-223 (2006) reported the conversion of benzyl alcohol to benzaldehyde by reaction with potassium ferrate in the cyclohexane/water in the presence of benzyltrimethylammonium chloride. Similar chemistry was described by Kim et al. in Synthesis, 10, 866-8 (1984).

BRIEF DESCRIPTION OF THE INVENTION

Broadly, a corrosion resistant primer coating of this invention includes one or more corrosion inhibiting additives and one or more nonaqueous resins and the methods of making the coating. The primer coating is useful in preventing general and pitting corrosion on metal substrates.

A. Corrosion Resistant Primer Coating

In general, a Corrosion resistant primer coating in the present invention comprises one or more corrosion inhibiting additives and one or more nonaqueous resins.

Preferably, the corrosion inhibiting additives comprise metal ferrate(IV) compounds, metal ferrate(V) compounds, metal ferrate(VI) compounds, or mixtures thereof, all of which are collective called as either the ferrate compounds, the ferrate, or the metal ferrate compound. Preferably, the metal cation in the ferrate compound can be an alkali metal, alkaline earth metal, a transition metal, a group IIIA metal, a group IVA metal, a group VA metal, lanthanide metal, and a combination thereof. Unlimited examples of the metal cation are Li, Na, K, Rb, Cs, Mg, Ca, Sr, Ba, Sc, Y, La, other lanthanide, Zn, Cd, Al, Ga, In, Tl, Pb, Bi, or mixtures thereof.

The most preferred metal ion is alkaline earth metal ion, such as strontium or barium. Specifically, alkaline earth metal ions, along with other metal ions mentioned above, can produce ferrate compounds with a low solubility in water in the range of about 0.001 ppm to about 2000 ppm at a temperature in the range of about 0° C. to about 71° C. Preferably, the ferrate compounds of our invention have solubility in water in the range of about 0.01 ppm to about 100 ppm at a temperature in the range of about 0° C. to about 71° C. Most preferably, the ferrate compounds of our invention have solubility in water in the range of about 0.1 ppm to about 10 ppm at a temperature in the range of about 0° C. to about 71° C.

In addition, the amount of the ferrate compound of low solubility should be present in the primer coating in a range of about 0.01 wt % to about 25 wt %. More preferably, the ferrate compound is present in a range of about 0.1 wt % to about 15 wt %, and most preferably, the ferrate compound is present in a range of about 1 wt % to about 10 wt %.

Alternatively, the ferrate compound with higher solubility can be encapsulated to reduce the rate of release of the free ferrate ions. The encapsulation is preferably nonporous having little or no permeability to moisture, liquid or vapor.

In another embodiment, ferrate ions of the higher solubility ferrate compounds can be incorporated into a solid solution with other compatible ions. The compatible ions include, but not limited to, a sulfate ion, a chromate ion, a silicate ion, an aluminate ion, an orthophosphate ion, a borate ion, a carbonate ion, a titanate ion, a zirconate ion, a manganate ion, a molybdate ion, or a mixture thereof.

In a preferred corrosion resistant primer coating of the present invention, the nonaqueous resin can be, but not limited to, epoxy resin, alkyd, polyester, polyurethane, polyolefin, polyamide, polysulfide, polythiol ether, phenolic, urethane, polyvinyl, rosin esters, silicones, siloxanes, perfluorinated resin, other fluorinated resin, Teflon®, polyvinylidene difluoride, nylon, copolymers thereof, or mixtures thereof. The epoxy resin is preferably diglycidyl ether bisphenol.

Further, the primer coating of the present invention includes one or more nonaqueous solvents. The nonaqueous solvents can be used to reduce viscosity of the resins and/or slow down the thickening or crosslinking reaction of the primer coating mixture. The unlimited examples of the non-aqueous solvent are xylene, toluene, petroleum distillate, ketone, N-methylpyrrolidone, triethanolamine, 2-ethoxyehtanol, other nonaqueous solvent, or combinations thereof.

In addition, the primer coating of the present invention may optionally include one or more filler additives to produce a primer coating of better physical properties, such as impact resistance, flexibility, hardening, or shrinkage control. The filler additive can be, but not limited to, a pH buffer, an encapsulation agent, a phase transfer catalyst, a wetting agent, a binder, a dispersant, a gelling material, a caustic agent, a thickener, an accelerant, an emulsifier, a optional de-colorant, a humectants, an optional colorant, an optional antifungal, an optional antibacterial, or combinations thereof.

In addition, some filler additives, such as alcohols or ether alcohols, can be used to keep moisture away from the ferrate compounds to prevent decomposition of the ferrate ions or to extend the stability of the ferrate compound in storage. In the present invention, the ferrate compounds are substantially insoluble in the preferred alcohols or the preferred ether alcohols. The alcohols or ether alcohols can absorbs and retain up to at least 5 wt % of water based on the cured primer coating weight.

Unlimited examples of the filler additives include monophosphates, poly-phosphates, bicarbonate salts, calcium carbonates, sulfate salts, orthophosphate esters, orthophosphate salts, tetraorganoammoniurn ions, pyrophosphate salts, titanium dioxides, clay silicates, aluminum silicates, aluminates, aluminosilicates, talc, mica, silica, silicates, magnesium silicates, zinc oxides, barite sulfates, barium sulfates, or mixtures thereof. Some of these examples can have multiple functions.

In a further embodiment, the primer coating also includes one or more curing agents. Preferably, the curing agent includes polyamine, polyamidoamine, polyol, polyester, aminopolyol, or mixtures thereof.

Preferably, in the primer coating of the present invention, the combined weight percentage of the ferrate compounds and the filler additive is in a range of about 0.05 wt % to about 55 wt %. Optimally, the combined weight percentage is in a range of about 40 wt % to about 55 wt %.

B. Method of Making the Corrosion Resistant Primer Coating

A method of making a corrosion resistant primer coating of the present invention include combining the corrosion inhibiting additives with one or more nonaqueous resins, one or more optional filler additives, one or more optional nonaqueous solvents, and one or more optional curing agents. Preferably, the corrosion inhibiting additives are the metal ferrate (IV) compounds, the metal ferrate(V) compounds, the metal ferrate(VI) compounds, or a mixture thereof.

Preferably, the metal ferrate compounds can be pre-formed prior to combining them with nonaqueous resins or other ingredients. The pre-formed metal ferrate compound suitable for the primer coating of the present invention are described in details in Section A. Similarly, the nonaqueous resins, the optional filler additives, the optional nonaqueous solvents, and the optional curing agents are also described in details in Section A.

In a further embodiment, the present invention can be produced by (a) mixing the corrosion inhibiting additives, the optional filler additive, the optional solvent, the optional curing agent, and a first portion of a nonaqueous resin; and (b) mixing the second portion of the resin to the mixture of step (a) until the primer is formed. The two step mixing process is preferred for some nonaqueous resins, such as epoxy resins. The corrosion inhibiting additives are preferably the metal ferrate compounds described in section A.

In addition, the primer coating of the present invention can be used for field application by (a) putting the metal ferrate compounds in one container, and (2) putting the other ingredients, such as the nonaqueous resins, the optional filler additives, the optional solvents, the optional curing agents, in one or more additional container. All ingredients of the primer coating can be added together at the point of use, or at the point of release from their containers. Preferably, the other non-ferrate ingredients can be pre-mixed before storing in the additional container.

Further, the corrosion inhibiting additives, such as the ferrate compounds, can be encapsulated or embedded in a solid solution with one or more compatible ions.

Alternatively, the metal ferrate compounds for the primer can be made in-situ while making the corrosion resistant primer coating. The in-situ method includes adding highly soluble metal-1 salts, alkali metal ferrate compounds, and metal-2 hydroxide to one or more nonaqueous resins to make the corrosion resistant primer, during which the preferred metal-1 ferrate compounds of the low solubility can be produced in-situ.

The metal-1 ion and the metal-2 ions can be the same, or they can be different from each other. The metal-1 ion includes, but not limited to, an alkaline earth metal, a transition metal, a group III metal, a group IVA metal, a group VA metal, lanthanide metal, and a combination thereof. The unlimited examples of the metal-1 ion include Mg, Ca, Sr, Ba, Zn, Sc, Y, La, other lanthanide, Zn, Cd, Al, Ga, In, Tl, Pb, Bi, or mixtures thereof. Unlike the metal ions in the ferrate compound of Section A, the metal-1 ion does not have any alkali metal ion. Preferably, the metal-1 salt is barium chloride or strontium chloride. More preferably, the highly soluble metal-1 salt of step a has a solubility in water in the range of about 5 wt % to about 65 wt % at a temperature in the range of about 0° C. to about 71° C.

The metal-2 ion can be an alkaline earth metal, an alkali metal, or a combination thereof. 117. Preferably, the metal-2 hydroxide has a solubility in water in the range of at least 0.1 molar at a temperature in the range of about 0° C. to abut 100° C. More preferably, the metal-2 hydroxide is potassium hydroxide.

Further, one or more optional filler additives, one or more nonaqueous solvents, and/or one or more curing agents can also be used in the mixing step to produce the preferred ferrate compound in-situ and to make the primer coating. A pH buffer might be needed to maintain the pH of the mixture to be at least 9 or above, preferably at 13 or above.

The in-situ metal ferrate compound so produced preferably have a low solubility in water in the range of about 0.001 ppm to about 2000 ppm at a temperature in the range of about 0° C. to about 71° C. More preferably, the ferrate compounds have a solubility in water in the range of about 0.01 ppm to about 100 ppm at a temperature in the range of about 0° C. to about 71° C. Most preferably, the ferrate compounds have a solubility in water in the range of about 0.1 ppm to about 10 ppm at a temperature in the range of about 0° C. to about 71° C.

C. Method of Treating a Metal Surface for Corrosion Resistance Using a Corrosion Resistant Primer A method for treating a metal surface for corrosion resistance include preparing and treating the metal surface, and then applying a corrosion resistant primer coating on the prepared metal surface. The corrosion resistant primer coating are preferably formulated as described in Sections A and B. Preferably, the metal surface includes, but not limited to, iron, zinc, aluminum, steel, carbon steel, stainless steel, other iron alloy, zinc alloy, zinc galvanized metal, cadmium plated metal, aluminum alloy, aluminum copper alloy, aluminum magnesium alloy, steel alloy, or combinations thereof.

The metal surface is preferably prepared and treated by cleaning and deoxidizing the metal surface, and then providing a thin layer of adhesion promoting film on the cleaned and deoxidized metal surface. In one preferred embodiment, the cleaned and deoxidized metal surface is washed or rinsed with water to wash/rinse off any grease, dirt, or rust. Preferably the rinsing water is de-ionized water. Alternatively, without any rinsing with water, any grease, dirt and rust from the cleaning and deoxidizing are trapped in the adhesion promoting film.

The adhesion promoting film can be a surface treatment film and/or a conversion coating film. Moreover, the adhesion promoting film can include one or more layers. As a one layer film, the adhesion promoting film is a surface treatment film. Alternatively, the adhesion promoting film is a corrosion resistant conversion coating.

The conversion coating etches into the prepared metal surface and then reacts with the metal on the metal surface to form a thin protective film layer to protect against corrosion. The protective film can be a protective oxide film, a phosphate film, a silica film, or a mixture thereof.

Preferably, the conversion coating includes a chromium compound, a non-chromium compound, or combinations thereof. The unlimited examples of a corrosion inhibiting additive in the conversion coating include a Cr(VI) compound, a Cr(III) compound, a $CeO_2$ compound, a manganese oxide compound, a ferrate(V) compound, a ferrate(VI) compound, a ferrate(VI) compound, a phosphate compound, a phosphatizing compound, a silica forming compound, or mixtures thereof. Optimally, the conversion coating is an aqueous solution of inorganic compounds, such as chromate or ferrate.

Preferably, the adhesion promoting film includes two film layers, which can be applied to the cleaned and deoxidized metal surface by the steps of applying the conversion coating film on the cleaned and deoxidized metal surface; and then applying the surface treatment film on the conversion coated metal surface. In Example 4 below, the two layers of conversion coating/surface treatment film have been shown to be effective in preventing corrosion on an aluminum surface. Most preferably, the two film layers include a protective oxidative ferrate conversion film layer and then a PreKote® surface treatment layer.

In a further embodiment, a layer of top-coat (also called top coating) is applied on the primer coated metal surface. Preferably, the top-coat includes, but not limited to, polyurethane or epoxy.

D. Method of Producing Metal Ferrate Compounds of Low Solubility

A preferred method of producing the preferred metal-1 ferrate compound (the ferrate compound) includes steps of (a) dissolving and mixing a highly soluble metal-1 salt and an optional metal-1 hydroxide in water, wherein the metal-1 salt, the optional metal-1 hydroxide, and the metal-1 ferrate compound comprise the same metal-1 ion;

(b) dissolving and mixing an alkali metal ferrate compound and a metal-2 hydroxide in water;

(c) adding the solution of step (b) to the solution of step (a) to form a preproduct, wherein the preproduct comprises the metal-1 ferrate compound;

(d) filtering and washing the preproduct with one or more solvents to obtain the metal-1 ferrate compound; and (e) drying the metal ferrate compound in a low moisture environment to obtain the dried metal-1 ferrate compound;

wherein the metal-1 ion and the metal-2 ion are the same or are different from each other. Preferably, the water in steps a and b is de-aerated and de-ionized water.

The metal-1 ferrate compound is the same as the metal ferrate compound discussed in more details in Section A. Moreover, the metal-1 ion is the same as the metal ion in the ferrate compound described in Section A. Metal-1 ion is so designated to distinguish it from the metal-2 ion.

The metal-2 ion can be an alkali metal ion, an alkaline earth metal ion, or a combination thereof. Preferably, the metal-2 ion is the alkali metal ion. In addition, the metal-2 hydroxide has a solubility in water in the range of at least 0.1 molar at a temperature in the range of about 0° C. to abut 100° C. Preferably, the metal-2 hydroxide is in a concentration that is suitable to maintain the resulting solution of steps b and c at a pH 7 or above. At the same time, the metal-2 hydroxide is in a suitable amount to cause a precipitation of the resulting metal ferrate compound without any co-precipitation of other metal salts. Optimally, the concentration of the metal-2 hydroxide is in the range of about 0.5 wt % to about 10 wt %.

In a preferred embodiment, the highly soluble metal-1 salt of step (a) has a solubility in water in the range of about 5 wt % to about 65 wt % at a temperature in the range of about 0° C. to about 71° C. The anion in the metal-1 salt of step (a) is selected from a group consisting of chloride, bromide, methanesulfanate, nitrate, acetate, trifluoacetate, perchlorate, and mixtures thereof.

Preferably, steps (b)-(c) are maintained at a pH 7 or above. More preferably, the steps (b)-(c) are maintained at a pH 9 or above. Even more preferably, steps (b)-(c) are maintained at a pH 11 or above. Optimally, steps (b)-(c) are maintained at a pH 13 or above. Maintaining a higher pH during the production of the ferrate compound promotes the precipitation of the preferred ferrate compound with substantially no co-precipitation of any other metal salts. The metal-2 hydroxide is in a concentration that is suitable to maintain the resulting solution of steps b and c at a pH 7 or above, and wherein the metal-2 hydroxide is in a suitable amount to cause a precipitation of the resulting metal ferrate compound without any co-precipitation of other metal salts.

In addition, the solvent of step d is suitable for isolating the metal-1 ferrate compound. In other words, the suitable solvent is a solvent in which the metal-1 ferrate compound is insoluble, and which is capable of dissolving and washing off any other metal salts or metal hydroxide.

Unlimited examples of the solvent of step d include water, methanol, ether, other alcohol, reducing agent free aliphatic with a total carbon number less than 7, aryl aliphatic with a total carbon number less than 12, or a combination thereof. In one embodiment, the solvent of step (d) is de-aerated and de-ionized water. In another embodiment, the solvent of step is methanol, ether, or a combination thereof.

In a further embodiment, steps (a)-(d) are carried out in a temperature that is suitable for precipitation of the metal ferrate compound with substantially no co-precipitation of other metal salts. Preferably, the temperature in (a)-(d) is suitable for a 99% precipitation of the metal ferrate compound. More preferably, the temperature in steps a-d is in the range of about 0° C. to about 45° C. In one embodiment, the temperature in (a)-(d) is in a range of about 24° C. to 35° C. Ideally, the temperature in (a)-(d) is about 4° C. Optimally, the combination of a high pH and a lower temperature helps in producing a relative high yield of the preferred ferrate compound of a high purity.

DETAILED DESCRIPTION OF THE INVENTION AND BEST MODE

Broadly, this invention provides for a primer coating useful in preventing corrosion of metal or metal alloys. The primer coating can also be applied on a metal surface in combination with other coating layers, such as a conversion coating layer and/or a top-coat layer.

A. Corrosion Resistant Primer Coating

In general, a corrosion resistant primer coating in the present invention comprises one or more corrosion inhibiting additives and one or more nonaqueous resins.

Preferably, the corrosion inhibiting additives comprise metal ferrate(IV) compounds, metal ferrate(V) compounds, metal ferrate(VI) compounds, or mixtures thereof, all of which are collectively called as either the ferrate compounds, the ferrate, or the metal ferrate compound. The ferrate(VI) anion is the most easily handled of the three high oxidative states of ferrate anions. Normally, upon reacting with water or metal (or through other types of oxidative reaction), the ferrate(VI) anion ("Fe(VI)") is reduced to the lower oxidation state of the ferrate(V) anion ("Fe(V)") or the ferrate(IV) anion ("Fe(IV)"). Fe(IV) can then be further reduced to more stable and lower oxidative states of Fe(III) or Fe(II).

Fe(III) oxide, phosphate, and other compounds are usually referred to collectively as "ferric" oxides and ferric phosphates. Fe(III) is only slightly oxidatively reactive. Moreover, its unusually stable oxide or phosphate salts are very insoluble, making Fe(III) an excellent candidate for conversion coatings provided that the films formed are not too thick or contain residual internal stress. On the other hand, Fe(II) is substantially water soluble, and so it does not form substantiative coatings that create barriers to $CO_2$ or air penetration.

Fe(II) and Fe(III) are frequently used in pigments and aqueous solutions without any incompatibility problem with organic components; however, they are not used to form protective and adherent oxidative layers to prevent corrosion of metal or metal alloys. In fact, the opposite is true, when iron corrodes, it forms either Fe(II) that leaches away into water, or ferric oxide rust that falls from the iron as loose particles, which exposes more underlying iron to also be corroded.

The ferrate compounds of the present invention are capable of protecting the surface of the metal or metal alloys in a primer coating without creating any substantial incompatibility issue with organic components in the primer coating. Preferably, the metal cation in the ferrate compound for the primer of the present invention is an alkali metal, alkaline earth metal, a transition metal, a group IIIA metal, a group IVA metal, a group VA metal, lanthanide metal, and a combination thereof. Unlimited examples of the metal cation are nonoxidizable oxidation states of Li, Na, K, Rb, Cs, Mg, Ca, Sr, Ba, Sc, Y, La, other lanthanide, Zn, Cd, Al, Ga, In, Tl, Pb, Bi, or mixtures thereof.

The most preferred metal ion for achieving the longest-lived corrosion control barrier primer coating is alkaline earth metal ion, such as strontium or barium. Such alkaline earth metal ions stabilize ferrate anions through forming salts of low solubility in both water and organic phase and enable them to exist in a very rare high oxidative state of Fe(IV), Fe(V), or Fe(VI). Specifically, alkaline earth metal ions, along with other metal ions mentioned above, can produce ferrate compounds with a low solubility in water in the range of about 0.001 ppm to about 2000 ppm at a temperature in the range of about 0° C. to about 71° C. Preferably, the ferrate compounds of our invention have solubility in water in the range of about 0.01 ppm to about 100 ppm at a temperature in the range of about 0° C. to about 71° C. Most preferably, the ferrate compounds of our invention have solubility in water in the range of about 0.1 ppm to about 10 ppm at a temperature in the range of about 0° C. to about 71° C.

While not wishing to be bound by theory, it is presently believed that the low solubility of the ferrate compound in the present invention might result in a slow release over very long periods of time (at least weeks and months) of a much lesser amount of free ferrate anions. It is also believed that these ferrate salts are highly insoluble in the organics of the primer formulation which thereby prevents ferrate oxidizing the organic matrix of the primer. Further, the amount of free ferrate anions are low but are sufficient to enable ferrate ions to react with the metal on a metal surface to form a protective film to protect the metal surface against corrosion initially, and in cases when the coating is damaged by scratching, abrasion, repair, impact, and the like. The lesser amount of free ferrate anions might substantially reduce the overall reactivity of the ferrate compound so that the ferrate compound can be substantially compatible with organic components of the primer formation in the present invention. Moreover, the slow release of the ferrate ions might create a long term corrosion protection capability to the primer coating that might extend to months, years or longer.

Preferably, the amount of the ferrate compound of low solubility should be present in the primer coating in a range of about 0.01 wt % to about 25 wt %. More preferably, the ferrate compound is present in a range of about 0.1 wt % to about 15 wt %, and most preferably, the ferrate compound is present in a range of about 1 wt % to about 10 wt %.

Although the metal ferrate compounds of the present invention preferably have a low solubility in water as mentioned above, the ferrate compound with higher solubility can be encapsulated to reduce the rate of release of the free ferrate ions. The encapsulation is preferably nonporous having little or essentially no permeability to moisture, liquid or vapor. As such, the encapsulation can enhance the stability of the ferrate compound of any solubility, especially that of higher solubility, to enable the ferrate to be compatible with other components of the primer formulation. The ferrate compound can be encapsulated using any suitable micro emulsion and encapsulation coating technology already known in the industry. In these cases it is believed that the ferrate protection is released only when the coating is mechanically broken by scratching, abrasion, denting, and the like, where the freshly released ferrate can reform the protective film at the metal surface, which is disrupted by the mechanical damage.

Alternatively, ferrate ions of ferrate compounds can be incorporated into certain solid solutions with other compatible ions in solid crystals that are of low solubility, such as neutral or pH basic clays, minerals, low soluble salts, and the like. Such a solid solution can reduce the rate of release of free ferrate ions in a controlled fashion since the bulk solid is very slow to dissolve or essentially insoluble. A selected amount of ferrate ions can be embedded in solid solution crystals through crystallization or ion exchange processes already known in the art. After incorporating the solid solution of ferrate compound into the primer formulation, the solid solution crystals can then act as filler carrier salts in carrying the ferrate ions in the primer coating. The solid solution then can spread the ferrate ion evenly at a low concentration in the primer coating, control the rate of release of ferrate ions in the primer coating to generate protective oxide film layer at the site of any corroding or exposed metal surface, while preventing spontaneous premature decomposition of the ferrate ions.

The compatible ions that ferrate ions, especially ferrate (VI) ions can partially substitute for in solid solutions include, but are not limited to, a sulfate ion, a chromate ion, a silicate ion, an aluminate ion, an orthophosphate ion, a borate ion, a carbonate ion, a titanate ion, a zirconate ion, a manganate ion, a molybdate ion, or a mixture thereof.

In a preferred corrosion resistant primer coating of the present invention, the nonaqueous resin can be, but not limited to, epoxy resin, alkyd, polyester, polyurethane, polyolefin, polyamide, polysulfide, polythiol ether, phenolic, urethane, polyvinyl, rosin esters, silicones, siloxanes, perfluorinated resin, other fluorinated resin, Teflon®, polyvinylidene difluoride, nylon, copolymers thereof, or mixtures thereof. The epoxy resin is preferably diglycidyl ether bisphenol A.

Further, the primer coating of the present invention includes one or more nonaqueous solvents. The nonaqueous solvents can be used to reduce viscosity of the resins and/or slow down the thickening or crosslinking reaction of the primer coating mixture. The unlimited examples of the nonaqueous solvent are xylene, toluene, petroleum distillate, ketone, carboxylic acid ester, N-methylpyrrolidone, triethanolamine, 2-ethoxyehtanol, soy oil ester, other nonaqueous solvent, or combinations thereof.

In addition, the primer coating of the present invention may optionally include one or more filler additives to produce a primer coating of better physical properties, such as impact resistance, flexibility, hardening, or shrinkage control. The filler additive can be, but not limited to, a pH buffer, an encapsulation agent, a phase transfer catalyst, a wetting agent, a binder, a dispersant, a gelling material, a caustic agent, a thickener, an accelerant, an emulsifier, a optional de-colorant, a humectants, an optional colorant, an optional antifungal or mildewcide, an optional antibacterial, or combinations thereof.

As needed in some situations, some filler additives, such as phase transfer catalysts, can assist ferrate ion in migrating longer distances or faster to the abrasion site to prevent corrosion to the exposed metal surface. Further, pH buffer can be used to control reactivity of free ferrate ions in the primer film and nearby film layers, thus controlling the response time, compatibility and corrosion resistant capacity of the primer coating.

In addition, some filler additives, such as monomeric, oligomeric and/or polymeric alcohols or ether alcohols, collectively called "alcohols", can be used to keep moisture away from the ferrate compounds to prevent premature dissolution and decomposition of the ferrate ions, or to extend the stability and shelf life of the ferrate compound in storage. In the present invention, the ferrate compounds are substantially insoluble in the preferred alcohols. The alcohols can absorbs and retain up to at least 5 wt % of water based on the cured primer coating weight while preventing significant excessive dissolution of ferrate component. This combination is highly unexpected since ferrate rapidly oxidizes alcohols when both are dissolved in an aqueous solution.

Unlimited examples of the filler additives include monophosphates, poly-phosphates, bicarbonate salts, calcium carbonates, sulfate salts, orthophosphate esters, orthophosphate salts, symmetric or asymmetric tetraorganoammonium ions, pyrophosphate salts, titanium dioxides, clay silicates, aluminum silicates, aluminates, aluminosilicates, talc, mica, silica, silicates, magnesium silicates, zinc oxides, barite sulfates, barium sulfates, or mixtures thereof. Some of these examples can have multiple functions. For example, mono-phosphates or poly-phosphates can be used as pH buffers to control ferrate ion reactivity, as compatible ions in a solid solution with ferrate ions, or they can be used as encapsulation agents.

In a further embodiment, the primer coating also includes one or more curing agents. Curing agents or catalysts promotes or controls hardening of a resin polymer material and optional cross-linking of the resin polymer chains. Preferably, the curing agent includes polyamine, polyamidoamine, polyol, polyester, aminopolyol, or mixtures thereof.

Preferably, in the primer coating of the present invention, the combined weight percentage of the ferrate compounds and the filler additive is in a range of about 0.05 wt % to about 55 wt %. Optimally, the combined weight percentage is in a range of about 40 wt % to about 55 wt %.

B. Method of Making the Corrosion Resistant Primer Coating

A method of making a corrosion resistant primer coating of the present invention include combining the corrosion inhibiting additives with one or more nonaqueous resins, one or more optional filler additives, one or more optional nonaqueous solvents, and one or more optional curing agents. Preferably, the corrosion inhibiting additives are the metal ferrate (IV) compounds, the metal ferrate(V) compounds, the metal ferrate(VI) compounds, or a mixture thereof. In use, higher oxidation state ferrates (ferrate(VI) and ferrate(V)) can be converted to lower oxidation state ferrates (ferrate(V) and ferrate(IV)). Therefore, for maximum corrosion control capacity at any given time and for maximum corrosion control time, the most preferred ferrate to be used in the primer is ferrate(VI) material. The ferrate(VI) material supplies the maximum corrosion oxide film formation capability because it can be converted to ferrate(V), which continues to react to form ferrate(IV), which then can continue to react to form barrier oxide film consisting of Fe(III).

Preferably, the metal ferrate compounds can be pre-formed prior to combining them with nonaqueous resins or other ingredients. The method of producing the preferred ferrate compound of low solubility will be discussed in more details in Section D. The pre-formed metal ferrate compound suitable for the primer coating of the present invention are described in details in Section A. Similarly, the nonaqueous resins, the optional filler additives, the optional nonaqueous solvents, and the optional curing agents are also described in details in Section A.

In a further embodiment, the present invention can be produced by (a) mixing the corrosion inhibiting additives, the optional filler additives, the optional solvents, the optional curing agents, and a first portion of the nonaqueous resin; and (b) mixing the second portion of the resin to the mixture of step (a) until the primer is formed. The two step mixing process is preferred for some nonaqueous resins, such as epoxy resins. Moreover, this two step mixing process provides the advantage of in situ formation of ferrate corrosion inhibitor, which enables the level of corrosion inhibitor to be varied in proportion to the expected corrosive environment. The corrosion inhibiting additives are preferably the metal ferrate compounds described in section A.

In addition, the primer coating of the present invention can be used for field application by (a) putting the metal ferrate compounds in one container, and then (2) putting the other ingredients, such as the nonaqueous resins, the optional filler additives, the optional solvents, the optional curing agents, in one or more additional container. All ingredients of the primer coating can be added together at the point of use, or at the point of release from their containers. Preferably, the other non-ferrate ingredients can be pre-mixed before storing in the additional container.

The two or more part design is most preferred because it offers the advantage of maintaining separate compartments for storage. As such, the ferrate compound can remain stable during the separate storage, and then it can react to protect metal surfaces when it is combined with other ingredients of the primer. The ferrate compounds and the other ingredient/components can be mixed inside a nozzle, or inside an attachment container for a paint sprayer that meters the resulting primer into the major exiting paint spray stream. In this manner, a very large area surface can be painted efficiently, such as the surface of a ship hull or large aircraft fuselage.

Further, as described in more details in Section A, the corrosion inhibiting additives, such as the ferrate compounds, can be encapsulated or embedded in a solid solution with one or more compatible ions. Both of these methods can control the release rate of the ferrate ion to prolong storage stability and to enhance corrosion resistance capability of the primer.

Alternatively, the metal ferrate compounds for the primer can be made in-situ while making a corrosion resistant primer coating. The in-situ method includes adding highly soluble metal-1 salts, alkali metal ferrate compounds, and metal-2 hydroxide to one or more nonaqueous resins to make the corrosion resistant primer, during which the preferred metal-1 ferrate compounds of the low solubility can be produced in-situ. In-situ production of the preferred ferrate compounds means that the ferrate compound is produced during the process of making the corrosion resistant primer coating, and that no additional processing steps are required to produce the ferrate compound.

The metal-1 ion and the metal-2 ions can be the same, or they can be different from each other. The metal-1 ion includes, but is not limited to, an alkaline earth metal, a transition metal, a group III metal, a group IVA metal, a group VA metal, lanthanide metal, and a combination thereof. The unlimited examples of the metal-1 ion include Mg, Ca, Sr, Ba, Zn, Sc, Y, La, other lanthanide, Zn, Cd, Al, Ga, In, Tl, Pb, Bi, or mixtures thereof. Unlike the metal ions in the ferrate compound of Section A, the metal-1 ion does not have any alkali metal ion. Preferably, the metal-1 salt is barium chloride or strontium chloride. More preferably, the highly soluble metal-1 salt of step a has a solubility in water in the range of about 5 wt % to about 65 wt % at a temperature in the range of about 0° C. to about 71° C.

The metal-2 ion can be an alkaline earth metal, an alkali metal, or a combination thereof. Preferably, the metal-2 hydroxide has a solubility in water in the range of at least 0.01 molar, and most preferably 0.1 molar, at a temperature in the range of about 0° C. to about 100° C. Ideally, the metal-2 hydroxide is potassium hydroxide.

Further, one or more optional filler additives, one or more nonaqueous solvents, and/or one or more curing agents can also be used in the mixing step to produce the preferred ferrate compound in-situ and to make the primer coating. A pH buffer might be needed to maintain the pH of the mixture to be at least 9 or above, preferably at 11 or above, and more preferably at 13 or above.

The in-situ metal ferrate compound so produced preferably have a low solubility in water in the range of about 0.001 ppm to about 2000 ppm at a temperature in the range of about 0° C. to about 71° C. More preferably, the ferrate compounds have a solubility in water in the range of about 0.01 ppm to about 100 ppm at a temperature in the range of about 0° C. to about 71° C. Most preferably, the ferrate compounds of our invention have solubility in water in the range of about 0.1 ppm to about 10 ppm at a temperature in the range of about 0° C. to about 71° C.

C. Method of Treating a Metal Surface for Corrosion Resistance Using a Corrosion Resistant Primer Broadly speaking, the corrosion resistant primer coatings are useful in many industries, including the aerospace industry, automotive industry, architectural industry, packaging industry, electronics industry, HVAC, transportation, construction, and marine. Unlimited examples of uses for the present invention include application on vehicle conveyances, mobile objects, fixed structure, infrastructure, and production related metal structure. An unlimited list of vehicle conveyances and mobile objects includes ships, trains, railway cars, aircraft, cars, agricultural vehicles, satellites, spacecraft, missiles, and other such objects. An unlimited list of fixtures and infrastructures include's highway bridges, gas transmission pipelines, liquid transmission pipelines, drinking systems, sewer systems, electric utilities, telecommunication towers and buildings. Examples of production related metal structures include but not limited to oil rigs, gas rigs, mining structures, petroleum refining, chemical equipment, petrochemical structure, pharmaceutical equipment, pulp mills, paper mills, agricultural installation equipment, food processing equipment, electronics production equipment, and home appliances.

A method for treating a metal surface for corrosion resistance include preparing and treating the metal surface, and then applying a corrosion resistant primer coating on the prepared metal surface. The corrosion resistant primer coating are preferably formulated as described in Sections A and B. Preferably, the metal surface includes, but not limited to, iron, zinc, aluminum, steel, carbon steel, stainless steel, other iron alloy, zinc alloy, zinc galvanized metal, cadmium plated metal, aluminum alloy, aluminum copper alloy, aluminum magnesium alloy, steel alloy, or combinations thereof.

The metal surface is preferably prepared and treated by cleaning and deoxidizing the metal surface, and then providing a thin layer of adhesion promoting film on the cleaned and deoxidized metal surface. In one preferred embodiment, the cleaned and deoxidized metal surface is washed or rinsed with water to wash/rinse off any grease, dirt, or rust. Preferably the rinsing water is de-ionized water. Alternatively, without any rinsing with water, any grease, dirt and rust from the cleaning and deoxidizing are trapped in the adhesion promoting film.

The adhesion promoting film can be a surface treatment film and/or a conversion coating film. Moreover, the adhesion promoting film can include one or more layers. As a one layer film, the adhesion promoting film is a surface treatment film. Alternatively, the adhesion promoting film is a corrosion resistant conversion coating.

The surface treatment film is merely a thin film left on the metal surface after the cleaning and deoxidizing step. The surface treatment film merely promotes adhesion. It does not offer any corrosion protection. The conversion coating etches into the prepared metal surface and then reacts with the metal on the metal surface to form a thin protective film layer to protect against corrosion. The protective film can be a protective oxide film, a phosphate film, a silica film, or a mixture thereof.

Preferably, the conversion coating includes a chromium compound, a non-chromium compound, or combinations thereof. The unlimited examples of a corrosion inhibiting additive in the conversion coating include a Cr(VI) compound, a Cr(III) compound, a $CeO_2$ compound, a manganese oxide compound, a ferrate(V) compound, a ferrate(VI) compound, a ferrate(VI) compound, a phosphate compound, a phosphatizing compound, a silica forming compound, or mixtures thereof.

Optimally, the conversion coating is an aqueous solution of inorganic compounds, such as chromate or ferrate. The conversion coating must be applied to a cleaned and preferably deoxidized metal surface so that the oxidants in the coating can etch into the metal surface and react with the metal to form a very thin layer of protective oxide film (0.001 to 0.1 mil thickness). The reaction with the metal used up all the oxidants in the conversion coating, and the protective oxide film is very un-reactive and stable. As such, the resulting protective oxide film creates a barrier against invasion of moisture and other environmental factors, protecting the metal surface from future rusting.

The conversion coating is generally made immediately before application and then applied on metal surfaces within a very short period of time. Therefore, the conversion coating can utilize the oxidative potential of the ferrate ions without having to worrying about the instability issue associated with the ferrate ions.

Although both types of films are really thin, the surface treatment film is generally thinner than the conversion coating film. The conversion coating film can be up to 0.11 mil thick. The surface treatment film is only a few molecules thick and is too thin to be measured. The adhesion promoting film is needed to prepare the metal surface to receive the primer coating so that the primer coating can adhere to the metal surface adequately.

Preferably, the adhesion promoting film includes two film layers, which can be applied to the cleaned and deoxidized metal surface by the steps of applying the conversion coating film on the cleaned and deoxidized metal surface; and then applying the surface treatment film on the conversion coated metal surface. In Example 4 below, the two layers of conversion coating/surface treatment film have been shown to be effective in preventing corrosion on an aluminum surface. Most preferably, the two film layers include a protective oxidative ferrate conversion film layer and then a PreKote® surface treatment layer.

In a further embodiment, a layer of top-coat (also called top coating) is applied on the primer coated metal surface. Preferably, the top-coat includes, but not limited to, polyurethane or epoxy.

D. Method of Producing Metal Ferrate Compounds of Low Solubility

As indicated above, it is preferable to use a ferrate compound of low solubility as the corrosion inhibiting additive in the primer coating of the present invention. The preferred solubility in water for the ferrate compound is in the range of 0.001 ppm to 2000 pm at a temperature in the range of about 0° C. to about 71° C. As shown by Examples 5-13 below, it is difficult to produce a high yield of the preferred ferrate compound, and it is even more difficult to produce the ferrate compound of a high purity.

A preferred method of producing the preferred metal-1 ferrate compound (the ferrate compound) includes steps of (a) dissolving and mixing a highly soluble metal-1 salt and an optional metal-1 hydroxide in water, wherein the metal-1 salt, the optional metal-1 hydroxide, and the metal-1 ferrate compound comprise the same metal-1 ion;

(b) dissolving and mixing an alkali metal ferrate compound and a metal-2 hydroxide in water;

(c) adding the solution of step (b) to the solution of step (a) to form a preproduct, wherein the preproduct comprises the metal-1 ferrate compound;

(d) filtering and washing the preproduct with one or more solvents to obtain the metal-1 ferrate compound; and (e) drying the metal ferrate compound in a low moisture environment to obtain the dried metal-1 ferrate compound;

wherein the metal-1 ion and the metal-2 ion are the same or are different from each other. Preferably, the Water in steps a and b is de-aerated and de-ionized water.

The metal-1 ferrate compound is the same as the metal ferrate compound discussed in more details in Section A. Moreover, the metal-1 ion is the same as the metal ion in the ferrate compound described in Section A. Metal-1 ion is so designated to distinguish it from the metal-2 ion.

The metal-2 ion can be an alkali metal ion, an alkaline earth metal ion, or a combination thereof. Preferably, the metal-2 ion is the alkali metal ion. In addition, the metal-2 hydroxide has a solubility in water in the range of at least 0.1 molar at a temperature in the range of about 0° C. to abut 100° C. Preferably, the metal-2 hydroxide is in a concentration that is suitable to maintain the resulting solution of steps b and c at a pH 7 or above. At the same time, the metal-2 hydroxide is in a suitable amount to cause a precipitation of the resulting metal ferrate compound without any co-precipitation of other metal salts. Optimally, the concentration of the metal-2 hydroxide is in the range of about 0.5 wt % to about 10 wt %.

In a preferred embodiment, the highly soluble metal-1 salt of step (a) has a solubility in water in the range of about 5 wt % to about 65 wt % at a temperature in the range of about 0° C. to about 71° C. The anion in the metal-1 salt of step (a) is selected from a group consisting of chloride, bromide, methanesulfanate, nitrate, acetate, trifluoacetate, perchlorate, and mixtures thereof.

Preferably, steps (b)-(c) are maintained at a pH 7 or above. More preferably, the steps (b)-(c) are maintained at a pH 9 or above. Even more preferably, steps (b)-(c) are maintained at a pH 11 or above. Optimally, steps (b)-(c) are maintained at a pH 13 or above. Maintaining a higher pH during the production of the ferrate compound promotes the precipitation of the preferred ferrate compound with substantially no co-precipitation of any other metal salts. The metal-2 hydroxide is in an concentration that is suitable to maintain the resulting solution of steps b and c at a pH 7 or above, and wherein the metal-2 hydroxide is in a suitable amount to cause a precipitation of the resulting metal ferrate compound without any co-precipitation of other metal salts.

In addition, the solvent of step d is suitable for isolating the metal-1 ferrate compound. In other words, the suitable solvent is a solvent in which the metal-1 ferrate compound is insoluble, and which is capable of dissolving and washing off any other metal salts or metal hydroxide.

Unlimited examples of the solvent of step d include water, methanol, ether, other alcohol, reducing agent free aliphatic with a total carbon number less than 7, aryl aliphatic with a total carbon number less than 12, or a combination thereof. In one embodiment, the solvent of step (d) is de-aerated and de-ionized water. In another embodiment, the solvent of step is methanol, ether, or a combination thereof. The ferrate compound is first washed with methanol, and then followed by washing by ether to get rid of residual methanol.

In a further embodiment, steps (a)-(d) are carried out in a temperature that is suitable for precipitation of the metal ferrate compound with substantially no co-precipitation of other metal salts. Preferably, the temperature in (a)-(d) is suitable for a 99% precipitation of the metal ferrate compound. More preferably, the temperature in steps a-d is in the range of about 0° C. to about 45° C. In one embodiment, the temperature in (a)-(d) is in a range of about 24° C. to 35° C. Ideally, the temperature in (a)-(d) is about 4° C. Optimally, the combination of a high pH and a lower temperature helps in producing a relative high yield of the preferred ferrate compound of a high purity. For example, Example 13 demonstrated that such a procedure produced a 99.9% pure strontium ferrate compound produced in a yield of 63.1% of theoretical. It is theorized that the combination of high pH and low temperature increases the precipitation of the slightly soluble ferrate compound while ensuring substantially no co-precipitation of any other salts or base.

E. Examples

The present invention is further illustrated by the following examples which are illustrative of some embodiments of the invention and are not intended to limit the scope of the invention in any way:

1. Examples of Nonaqueous Ferrate (VI) Primer Coating

Example 1

This example evaluates the corrosion resistant potential of barium ferrate, strontium ferrate, and potassium strontium ferrate in a typical nonaqueous primer coating formulation.

The coating formulations are listed in Table 1 below. A typical epoxy primer formulation without anti-corrosive constituents (control-Sample 4) was prepared with barium sulfate filler pigment. Instead of the barium sulfate filler pigment, Samples 5, 6, 7 primers were prepared with barium ferrate, strontium ferrate, or potassium strontium ferrate at about 15% by weight loading.

In Table 1, Anti-Terra U is a trade name for a solution of a salt of unsaturated polyamine amides and lower molecular acid polymers. It is a wetting and dispersing additive for solvent-based and solvent-free coatings to improve pigment wetting, reduce the time required for the grinding process and stabilize the pigment dispersion. Anti-Terra U is composed of xylene and isobutanol in a ratio of 8:1.

Epon 828 is an epoxy resin available from Hexion Specialty Chemicals, USA. It is a trade name for an undiluted clear difunctional bisphenol A/epichlorohydrin derived liquid epoxy resin. When Epon 828 is cross-linked or hardened with appropriate curing agents, very good mechanical, adhesive, dielectric and chemical resistance properties are obtained.

Organotrol SA-7 is a quaternary/bentonite clay complex produced from naturally occurring montmorillonite clays, and quaternary ammonium chloride compounds, available from Cimbar Performance Minerals, Cartersville, Ga., USA.

EPIKURE™ Curing Agent 3175 is a modified polyamide supplied as 100 percent solids.

TABLE 1

Epoxy Primer Coating Formulations (quantities in grams)

| Material | Purpose | Sample 4 | Sample 5 | Sample 6 | Sample 7 |
|---|---|---|---|---|---|
| Part I | | | | | |
| EPON 828 | Base resin | 5.98 | 5.98 | 5.98 | 5.98 |
| Anti-Terra U | Dispersant | 0.13 | 0.13 | 0.13 | 0.13 |
| Toluene | Solvent | 1.88 | 1.88 | 1.88 | 1.88 |
| Glycol ether | Solvent | 0.51 | 0.51 | 0.51 | 0.51 |
| Organotrol SA-7 | Anti-settling agent | 0.26 | 0.26 | 0.26 | 0.26 |
| Titanium Dioxide | Opacifying Pigment | 6.78 | 6.78 | 6.78 | 6.78 |
| Barium Sulfate | Filler pigment | 8.57 | 1.07 | 1.07 | 1.07 |
| Barium ferrate | Corrosion inhibiting additive | 0 | 7.50 | 0 | 0 |
| Strontium Ferrate - 1 | Corrosion inhibiting additive | 0 | 0 | 7.50 | 0 |
| Strontium Ferrate - 2 | Corrosion inhibiting additive | 0 | 0 | 0 | 7.50 |
| Mica | Filler pigment | 5.00 | 5.00 | 5.00 | 5.00 |
| Xylene | Solvent | 2.42 | 2.42 | 2.42 | 2.42 |
| Part II | | | | | |
| Epon 828 | Let down resin | 0.79 | 0.79 | 0.79 | 0.79 |
| Epikure 3175 | Curing agent | 3.57 | 3.57 | 3.57 | 3.57 |
| Xylene | Let down solvent | 14.28 | 14.28 | 14.28 | 14.28 |

Procedure:
1. Grinded the solid ingredients in the above formulation by using a standard media grinding technique until a fineness of grind of at least 5 Hegman was achieved.
2. To 5.98 g of EPON 828, added the rest of Part I ingredients, such as anti-terra U, toluene, glycol ether, organotrol sa-7, titanium dioxide, barium sulfate, barium ferrate (if any), strontium ferrate (if any), potassium strontium ferrate (if any), mica, and xylene. Mixed for a minimum of two minutes.
3. Then to the step 2 mixture, added Part II ingredients, such as 0.79 g EPON 828, 3.75 g Epikure 3175, and 14.28 g xylene.
4. Waited for 30 minutes (an induction time). A portion of the resulting primer coating mixture, instead of applying onto the steel test panels, was allowed to sit in a sealed container for about 48 hours (pre-application resonance time testing). No effervescence or discoloration was observed after 48 hours.
5. Applied the rest of the resulting coating mixture to a surface of AISI 1020 steel test panels, which had been thoroughly cleaned and prepared (deoxidized) with commercial alkaline cleaner and acetone solvent. Then used a Dr. Blade drawdown bar to smooth the coating to a wet film thickness of 0.003 inches or 3.0 mils.
6. After the application of the primer coating onto the surface of the test panels, the coated test panels were left to cure for an entire weekend (about 48 hours) in room temperature in open air. No discoloration or blistering was observed on the coated panels after the weekend, indicating no decomposition of the primer coating occurred during the weekend.
7. Continued to cure the coating at the room temperature for a total of 2 weeks, which included the two days of curing in step 6. When fully cured, the total coating dry film thickness was approximately 0.0017 inches (1.7 mils).
8. Tested the coated panels for standard coating film performance. The results are listed in Table 2 below.
9. Performed two water immersion tests on the four coating samples illustrated in Tables 1-2.
    a. In the first water immersion test, the left halves of the coated panels were immersed in the distilled water bath for about 48 hours at about 100° F. At the end of the 48 hours, the immersed portions of the panels were visually inspected for any blistering.
    b. The second water immersion test was performed using the cured plugs of coating left over in the mixing container after the coatings had been applied to the steel test panels. These plugs were placed in a glass jar filled part way with distilled water and sealed. This test was performed to determine whether or not any of the ferrate materials would be extricated from the coating matrix in the aqueous environment, and then the extricated ferrate would dissolve and oxidize in the water. The extrication of the ferrate materials can be demonstrated by the leaching of pigments into the water. In other words, if there were any leaching of pigments into the water, the water would change color or become cloudy.

TABLE 2

Coating Test Results of Step 8

| Test | ASTM Method | Sample 4 | Sample 5 | Sample 6 | Sample 7 |
|---|---|---|---|---|---|
| Pencil Hardness | ASTM D3363 | 3H-4H | 4H | 4H | 2H |
| CrossHatch Adhesion | ASTM D3359 | 5B | 5B | 5B | 5B |
| Conical mandrel | ASTM D522 | 0% loss | 75% loss | 25% loss | 25% loss |
| MEK Double Rubs | ASTM D5402 | 60 | 55 | 14 | 40 |
| Gloss (20°/60°) | ASTM D2457 | 2.3/15.2 | 0.6/7.1 | 0.7/4.6 | 0.8/7.1 |

Discussion:

Table 2 shows that in general, the test coatings (Samples 5, 6 and 7) performed similarly to the control coating (Sample 4) with the exceptions of slightly reduced flexibility or elongation on the AISI 1020 steel panels and of Sample 6 having a poorer resistance to methyl ethyl ketone than the other coatings. In other words, these ferrate (VI) containing primers demonstrated good primer coating characteristics, such as adequate adhesion to the steel panel, MEK resistance, and flexibility.

The visual inspection result of the first water immersion test found that after 48 hours of immersion in water at 100° F., all of the panels showed some varying signs of blisters below the water line. The test panel 1 coated with the control primer coating (Sample 4) showed a few micro-blisters under the water line. The test panel 2 coated with the barium ferrate primer coating (Sample 5) showed small blisters under the water line. Both the test panel 3 coated with strontium ferrate primer coating (Sample 6) and the test panel 4 coated with potassium strontium ferrate primer coating (Sample 7) showed large blisters under the water line. The results confirmed the need for a surface treatment, and demonstrated that ferrate (VI) compounds, strontium ferrate or barium ferrates did not oxidize the organic components of the primer resin.

The second water immersion test showed that after two weeks, the water remained un-colored, un-cloudy and clear for the control coating 11 (Sample 4), the barium ferrate primer coating 12 (Sample 5), the strontium ferrate primer coating 13 (Sample 6), and potassium strontium ferrate primer coating 14 (Sample 7). In other words, there was no evidence of ferrate compounds leaching into the water. A leaching would result if the ferrate oxidized any organic component of the primer coating.

The water immersion test of step 9 showed that the ferrate (VI) compounds have shown some anticorrosive properties. Moreover, these two particular ferrate (VI) compounds were compatible or stable with organic components in the primer coating. The stability or compatibility of the ferrate compounds from the water immersion test was confirmed by the results of the "stability testing" performed in steps 4 and 6.

In step 4, a mixed but uncured primer was allowed to sit in a sealed container for about 48 hours, which is called pre-application resonance time testing. At the end of 48 hours, the testing showed no discoloration or effervescence, suggesting that the primer did not undergo decomposition after mixing the ferrate compound with the organic components. In step 6, the coated panels were left to dry in open air at room temperature for about 48 hours (over the weekend). No discoloration or blistering of the coating was observed on the coated panels after the weekend, indicating that the primer coating did not decomposed even when it was exposed to moisture and other elements in the open air. It also suggested that the ferrate compound is stable in the primer. Therefore, the stability testing results of steps 4, 6, and 9 demonstrated that these ferrate (VI) primers are chemically stable and are compatible with organic components in the primer.

While not wishing to be bound by theory, it is presently believed that barium and strontium ions reduce the activity of free ferrate(VI), ferrate(V) and/or ferrate(VI) ions to a sufficiently low level that very little of the ferrate ion mass is available to oxidize the organic component of the primer at any one time. In consequence, barium and strontium ions are able to prevent premature consumption of ferrate ions and achieve the desirable result of imparting corrosion protection for an extended time of maybe days, months or years. The longer the corrosion resistance can be provided, the more the primer coating of the present invention can be useful for a wider range of commercial applications.

The ferrate ions are very reactive with water, so the control of their exposure to water or moisture is very important. Such control can be achieved in four ways. First, the protective oxide film of substantially ferric ions ("Fe(III)") at the primer/metal interface provides inherent protection against moisture in the air. Unlike ferrate ions, ferric ions are very slow in reacting with water. Secondly, the ferrate compound can be incorporated into a hydroscopic nonaqueous primer coating so that the hydroscopic primer can protect the ferrate ion from being exposed to moisture. Thirdly, the nonaqueous primer coating can be hydrophilic so as to bond the water molecule and to keep the water molecule away from the ferrate ions. Therefore, the free water molecules available in the coating are insufficiently to provide a reducing environment for the ferrate compound, and to dissolve the metal ferrate compound of low solubility of the present invention.

Finally, the metal ferrate compound can be of sufficiently low solubility to reduce the level of the free ferrate ions present in the nonaqueous primer. These few free ferrate ions can then migrate to any possible crack sites in order to provide protective oxidation reaction to create the protective oxide layer. At the crack or scratch site these free ferrate ions are sufficient to re-oxidize the exposed metal to form the protective oxidative layer. The loading of the ferrate particulate into the primer can be adjusted to achieve the needed corrosion protection period and the capacity of corrosion resistance at any given time.

Example 2

This example further evaluates the corrosion resistant potential of barium ferrate and strontium ferrate in a typical nonaqueous primer coating formulation using an epoxy resin.

The metal panels used in this example are 2024-T3 aluminum alloy aerospace test panels.

The top-coat is a polyurethane topcoat meeting the performance requirements and military protocol of MIL-PRF-85285.

Procedure:

The general procedure is to:

(A) prepare a test metal panel by fabricating the metal panel and solvent cleaning the metal surface with methyl ethyl ketone;

(B) chemically treat the cleaned metal surface of step A by further cleaning the metal surface, and then applying either an adhesion-promoting surface treatment film or a conversion coating on the further cleaned surface;

(C) prepare primer coatings containing barium sulfate (control), barium ferrate (VI), or strontium ferrate;

(D) apply and cure the primer coatings on the prepared metal surfaces;

(E) apply and cure top-coat on the primer coated metal surfaces within 24 hours of the step C; and (F) test the coated metal panels for corrosion resistance through an environmental ocean sea breeze aerosol exposure open air testing at the Battelle Florida Material Research Facility (FMRF).

Step A: Prepare the metal test panel
1. Fabricated metal panels of 4.0 inch×6.0 inch from a 0.032 inch thick unclad 2024-T3 aluminum alloy. The test metal surface of the resulting metal panel was the metal surface without any ink stamping.
2. Cleaned (degreased) the exposed test metal surface by wiping the surface with clean white cotton cloth soaked with Methyl Ethyl Ketone (MEK). This process cleaned the metal surface by removing any processing greases or oils adhering to the surface.
3. The cleaned panels were separated into two sets to be processed according to the two surface treatment procedures of step B.

Step B: Treat the Surface of the Metal Test Panel (the Test Panels were Treated by Either Step 1 or Step 2)
1. To one set of the prepared test panels of step A, further clean and then apply a hexavalent chromium conversion coating to the test metal surfaces (the MIL-C-5541 panels, which can also be called Cr conversion coated panels).
    a. Spray applied alkaline soap meeting the military specification MIL-C-87936, agitate with non-scratch pads, and rinsed with cold water. DO NOT ALLOW TO AIR DRY.
    b. Etched the step a metal surface with white Scotchbrite pads saturated with dilute phosphoric acid for approximately 1 minute, and then rinse the surface with cold water. DO NOT ALLOW TO AIR DRY. This step deoxidized the cleaned metal surface and promotes better adhesion of the Cr conversion coating to the surface.
    c. Spray applied Alodine 1200 chromate conversion coating solution meeting the military specifications MIL-C-81760 and MIL-C-5541, and agitated with Scotchbrite pads. Allow the solution to dwell on the panel for 2-3 minutes for the formation of a thin conversion coating.
    d. Rinsed the surface of the step c panel with cold water, and ALLOW THE SURFACE TO AIR DRY.
    e. Inspected the treated metal surface for water break.
    f. The resulting conversion coated metal surface must be primer coated within 48 hours.
2. To the second set of the prepared test panels of step A, further clean and apply an adhesion film containing no hexavalent chromium to the test metal surfaces (the PreKote® panels, which can also be termed as no-Cr film coated panels).
    a. Spray applied PreKote solution, agitated with white Scotchbrite pads. This process removed oxides and lifted environmental contaminants off the prepared metal surface of step A. DO NOT RINSE OR ALLOW SURFACE TO AIR DRY.
    b. Spray applied PreKote solution to the metal surface of step a, and agitated with white Scotchbrite pads for approximately 1 minute.
    c. Rinsed the resulting film coated metal surface with cold water, and ALLOW THE SURFACE TO AIR DRY.
    d. Inspected the treated metal surface for water break.
    e. The resulting film coated metal surface must be primer coated within 48 hours.

Step C. Prepare the Primer Coatings Containing Barium Sulfate (Control), Barium Ferrate (VI), or Strontium Ferrate.
1. Added first nine materials listed in Table 3 to a Flaktek container.
2. Added approximately 30 g steel media (mixing/milling steel balls) to the Flaktek container.
3. Mixed the nine materials with the steel media for approx. 20 minutes at 2,000 rpm on a Flaktek DAC 150 Series Dual Asymmetric Centrifuge speed-mixer.
4. Checked the grind quality of the resulting mixture by using a Hegman-type gauge and following ASTM D 1210 Standard Test Method for Fineness of Dispersion of Pigment-Vehicle Systems.
5. If the grind is above 4 Hegman, continued to mix for an additional 5 minutes until at least a 4 Hegman fineness for the grind was achieved.
6. Added xylene part I and Epon 828 part II to the mixture in the Flaktek container, and mixed on the Flaktek speed-mixer for approximately 1 minute.

7. Removed steel media from the Flaktek container and weighed the resulting coating mixture.
8. To the mixture of step 7, added a suitable amount of Epicure 3175 (the amount of Epicure 3175 was based on the weight of the coating mixture collected in step 7), mixed on the Flaktek speed-mixer for 1 minute, and then allowed the resulting mixture to sit in the container for 30 minute (an induction time).
9. To the partially cured primer coating of step 8, added xylene part II to prevent curing from going too fast, stirred for about 1-5 minutes.

Step D. Apply and Cure the Primer Coatings
1. Applied the resulting primer coatings onto the surfaces of treated test panels of step B using a siphon fed HVLP spray equipment from Binks. All primer coatings were applied to a dry film thickness (DFT) of approximately 0.001 inch (1 mil). The primer coatings applied included coating Samples 11-12 listed in Table 3 and a standard hexavalent chromium primer coating meeting the requirements of MIL-PRF-23377 (Cr primer).
2. Air cured the primer coated panels at room temperature for approximately 8 hours.

Step E. Apply and Cure Top-Coat on the Primer Coated Metal Surfaces
1. Applied a MIL-PRF-85285 approved top-coat onto the primer coated metal surfaces of the step D using a siphon fed HVLP spray equipment from Binks. The top-coat was applied to a DFT of 0.002 inches (2 mils). The top-coat was designated as the Advanced Performance Coating (APC)/Extended Life Topcoat (ELT) version of the MIL-PRF-85285 provided by Deft Aerospace, product code 99-GY-010, Color, Fed-STD-595B 36251 Gray, batch #663178.
2. Air cured coated panels for 2 days at room temperature.
3. Aged panels for 14 days at 120° F., and then sent the panels to Battelle's Florida Materials Research Facility (FMRF) for outdoor exposure testing.

Step F. Tested the Coated Metal Panels for Corrosion Resistance Through an Environmental Ocean Sea Breeze Aerosol Exposure Open Air Testing at the FMRF
1. Scribed some of coated test panels by applying an X-shaped scratch on the coated surfaces. The scratch was carefully applied to create a defect on the coating surface all the way through layers of the coatings to the bare metal surface without damaging the bare metal surface.
2. Mounted all coated test panels (scribed or unscribed) on beachfront exposure racks at a 15 degree incline from vertical, facing south to maximize solar or UV radiation exposure.
3. Performed visual panel inspection at the specified intervals (see Table 4). Panel inspections included a visual inspection of scribed and unscribed surfaces for corrosion, edge creeping, blistering, and gross coating disbondment.
4. Digital photographs were collected on an "as-required" basis to document corrosion and coating-related issues.

TABLE 3

Epoxy Primer Coating Formulations Containing Strontium Ferrate (Sr Ferrate), Barium Ferrate (Ba Ferrate), or Barium Sulfate (Control) (quantities in grams)

| # | Chemical name | Material | Purpose | Sample 11 (Sr Ferrate-19.4 wt %) | Sample 12 (Ba Ferrate-19.8 wt %) | Sample 13 (control) |
|---|---|---|---|---|---|---|
| 1 | BISPHENOL A/ EPICHLOROHYDRIN | EPON 828-Part I | Base resin | 18.03 | 17.94 | 18 |
| 2 | Solution of a salt of unsaturated polyamine amides and lower molecular acid polymers | Anti-Terra U | Dispersant | 0.42 | 0.37 | 0.39 |
| 3 | Toluene | Toluene | Solvent | 5.72 | 5.6 | 5.66 |
| 4 | Glycol ether | Glycol ether | Solvent | 1.57 | 1.53 | 1.55 |
| 5 | Quaternary amine modified clays | Organotrol SA-7 | Anti-settling agent | 0.9 | 0.72 | 0.79 |
| 6 | Titanium Dioxide | Titanium dioxide | Opacifying Pigment | 20.33 | 20.42 | 20.48 |
| 7 | Barium Sulfate | Barium sulfate | Filler pigment | 5.22 | 3.19 | 25.82 |
| 8a | Barium ferrate | Barium ferrate | corrosive inhibiting additive | 0 | 22.58 | 0 |
| 8b | Strontium Ferrate | Strontium ferrate | corrosive inhibiting additive | 20.54 | 0 | 0 |
| 9 | Silicone | Mica | Filler pigment | 15.01 | 15.02 | 15.05 |
| Add steel media and grind to a 4H to 5H Hegman, then add xylene and Epon 828 below | | | | | | |
| 10 | Xylene | Xylene-- Part I | Solvent | 7.17 | 7.28 | 7.33 |
| 11 | BISPHENOL A/ EPICHLOROHYDRIN | Epon 828-Part II | Let down resin | 5.39 | 2.04 | 1.85 |
| Steel media removed from base epoxy and weighed | | | | | | |
| Total base epoxy material collected | | | | 68.4 | 73.68 | 76.71 |
| 12 | Modified polyamide | Epicure 3175 | Curing agent | 7.59 | 8.2 | 8.51 |
| Base epoxy material and Epikure 3175 permitted to induct (sweat in) for 30 minutes before xylene added | | | | | | |
| 13 | Xylene | Xylene-Part II | Let down solvent | 30 | 32.3 | 33.6 |

TABLE 4

Test Panel Coating Matrix*

| panel # | Coating Matrix | surface treatment | primer coating | primer dry film thickness** (mil) | ave topcoat dry film thickness (Calc)*** (mil) | X-scribed (Y/N) |
|---|---|---|---|---|---|---|
| 1 | Full Cr-top (reference) | MIL-C-5541 (Cr Conversion) | MIL-PRF-23377 (Cr Primer) | 1.03 | 2.33 | N |
| 2 |  | MIL-C-5541 (Cr Conversion) | MIL-PRF-23377 (Cr Primer) | 1.32 | 2.33 | Y |
| 3 | Cr-Control-top (Control) | MIL-C-5541 (Cr Conversion) | Sample 13 (control) | 1.52 | 2.33 | N |
| 4 |  | MIL-C-5541 (Cr Conversion) | Sample 13 (control) | 1.60 | 2.33 | Y |
| 5 |  | MIL-C-5541 (Cr Conversion) | Sample 13 (control) | 1.72 | 2.33 | Y |
| 6 | Cr—Ba Ferrate-top | MIL-C-5541 (Cr Conversion) | Sample 12 (Ba Ferrate) | 1.45 | 2.33 | N |
| 7 |  | MIL-C-5541 (Cr Conversion) | Sample 12 (Ba Ferrate) | 1.38 | 2.33 | Y |
| 8 |  | MIL-C-5541 (Cr Conversion) | Sample 12 (Ba Ferrate) | 1.24 | 2.33 | Y |
| 9 | Cr—Sr Ferrate-top | MIL-C-5541 (Cr Conversion) | Sample 11 (Sr Ferrate) | 1.65 | 2.33 | N |
| 10 |  | MIL-C-5541 (Cr Conversion) | Sample 11 (Sr Ferrate) | 1.49 | 2.33 | Y |
| 11 |  | MIL-C-5541 (Cr Conversion) | Sample 11 (Sr Ferrate) | 1.53 | 2.33 | Y |
| 12 | No Cr—Cr-top (reference) | PreKote (no Cr film) | MIL-PRF-23377 (Cr Primer) | 1.44 | 2.33 | N |
| 13 |  | PreKote (no Cr film) | MIL-PRF-23377 (Cr Primer) | 1.87 | 2.33 | Y |
| 14 | No Cr—No Cr-top (control) | PreKote (no Cr film) | Sample 13 (control) | 1.52 | 2.33 | N |
| 15 |  | PreKote (no Cr film) | Sample 13 (control) | 1.42 | 2.33 | Y |
| 16 |  | PreKote (no Cr film) | Sample 13 (control) | 1.17 | 2.33 | Y |
| 17 | No Cr—Ba Ferrate-top | PreKote (no Cr film) | Sample 12 (Ba Ferrate) | 1.19 | 2.33 | N |
| 18 |  | PreKote (no Cr film) | Sample 12 (Ba Ferrate) | 0.74 | 2.33 | Y |
| 19 |  | PreKote (no Cr film) | Sample 12 (Ba Ferrate) | 0.84 | 2.33 | Y |
| 20 | No Cr—Sr Ferrate-top | PreKote (no Cr film) | Sample 11 (Sr Ferrate) | 1.49 | 2.33 | N |
| 21 |  | PreKote (no Cr film) | Sample 11 (Sr Ferrate) | 1.44 | 2.33 | Y |
| 22 |  | PreKote (no Cr film) | Sample 11 (Sr Ferrate) | 1.92 | 2.33 | Y |

*The full Cr coating matrix and a preKote-Cr coating matrix were duplicated in panels 1-2 and 12-13. The rest coating matrixes were triplicated, such as panels 20-22.
**The primer coating thickness was measured by using an ultra-sonic thickness Positector 5000.
***The topcoat thickness was calculated by substracting the average treated panel thickness (substrate thickness) from the average final total coating thickness. The average thickness was an average of four measurements performed on the four different locations of one panel (the edges of the panel was not used in measuring thickness).

TABLE 5

Tabulated Summary of Visual Inspections Conducted on the Coated Test Panels*
PROJECT No. C355NSDD-FEPRIMEFLD
TYPE OF EXPOSURE: ATM OCEANFRONT 45 DEGREES SOUTH

| PANEL NUMBER | Panel Scribed | Scribe Corrosion | | | | | | Scribe Blistering/Undercutting | | | | | | Panel Blistering | | | | | |
|---|---|---|---|---|---|---|---|---|---|---|---|---|---|---|---|---|---|---|---|
| | | 1 | 2 | 4 | 8 | 14 | 185 | 1 | 2 | 4 | 8 | 14 | 185 | 1 | 2 | 4 | 8 | 14 | 185 |
| 1 | N | | | | | | | | | | | | | 10 | 10 | 10 | 10 | 10 | 10 |
| 2 | Y | 0 | 0 | 0 | 0 | 0 | 0 | 0 | 0 | 0 | 0 | 0 | 0 | 10 | 10 | 10 | 10 | 10 | 10 |
| 3 | N | | | | | | | | | | | | | 10 | 10 | 10 | 10 | 10 | 10 |
| 4 | Y | 0 | 0 | 0 | 0 | 1 | 2 | 0 | 0 | 0 | 0 | 0 | 0 | 10 | 10 | 10 | 10 | 10 | 10 |
| 5 | Y | 0 | 0 | 0 | 0 | 1 | 2 | 0 | 0 | 0 | 0 | 0 | 0 | 10 | 10 | 10 | 10 | 10 | 10 |
| 6 | N | | | | | | | | | | | | | 10 | 10 | 10 | 10 | 10 | 10 |
| 7 | Y | 1 | 1 | 1 | 1 | 1 | 2 | 0 | 0 | 0 | 0 | 0 | 1 | 10 | 10 | 10 | 10 | 10 | 10 |
| 8 | Y | 1 | 1 | 1 | 1 | 1 | 2 | 0 | 0 | 0 | 0 | 0 | 1 | 10 | 10 | 10 | 10 | 10 | 10 |
| 9 | N | | | | | | | | | | | | | 10 | 10 | 10 | 10 | 10 | 10 |
| 10 | Y | 1 | 1 | 1 | 1 | 1 | 2 | 0 | 0 | 0 | 0 | 0 | 0 | 10 | 10 | 10 | 10 | 10 | 10 |
| 11 | Y | 1 | 1 | 1 | 1 | 1 | 2 | 0 | 0 | 0 | 0 | 0 | 0 | 10 | 10 | 10 | 10 | 10 | 10 |

TABLE 5-continued

Tabulated Summary of Visual Inspections Conducted on the Coated Test Panels*
PROJECT No. C355NSDD-FEPRIMEFLD
TYPE OF EXPOSURE: ATM OCEANFRONT 45 DEGREES SOUTH

| PANEL NUMBER | Panel Scribed | Scribe Corrosion | | | | | | Scribe Blistering/Undercutting | | | | | | Panel Blistering | | | | | |
|---|---|---|---|---|---|---|---|---|---|---|---|---|---|---|---|---|---|---|---|
| | | 1 | 2 | 4 | 8 | 14 | 185 | 1 | 2 | 4 | 8 | 14 | 185 | 1 | 2 | 4 | 8 | 14 | 185 |
| 12 | N | | | | | | | | | | | | | 10 | 10 | 10 | 10 | 10 | 10 |
| 13 | Y | 1 | 1 | 1 | 0 | 0 | 2 | 0 | 0 | 0 | 0 | 0 | 0 | 10 | 10 | 10 | 10 | 10 | 10 |
| 14 | N | | | | | | | | | | | | | 10 | 10 | 10 | 10 | 10 | 10 |
| 15 | Y | 0 | 0 | 0 | 0 | 2 | 2 | 0 | 0 | 0 | 0 | 1 | 2 | 10 | 10 | 10 | 10 | 8 | 4 |
| 16 | Y | 0 | 0 | 0 | 2 | 2 | 2 | 0 | 0 | 0 | 1 | 1 | 2 | 10 | 10 | 10 | 10 | 8 | 4 |
| 17 | N | | | | | | | | | | | | | 10 | 10 | 10 | 10 | 10 | 10 |
| 18 | Y | 1 | 1 | 1 | 2 | 2 | 2 | 0 | 0 | 0 | 1 | 1 | 2 | 10 | 10 | 10 | 10 | 10 | 6 |
| 19 | Y | 1 | 1 | 1 | 2 | 2 | 2 | 0 | 0 | 0 | 1 | 1 | 2 | 10 | 10 | 10 | 10 | 10 | 6 |
| 20 | N | | | | | | | | | | | | | 10 | 10 | 10 | 10 | 10 | 10 |
| 21 | Y | 1 | 1 | 1 | 1 | 2 | 2 | 0 | 0 | 0 | 0 | 0 | 1 | 10 | 10 | 10 | 10 | 10 | 8 |
| 22 | Y | 1 | 1 | 1 | 1 | 1 | 2 | 0 | 0 | 0 | 0 | 0 | 0 | 10 | 10 | 10 | 10 | 10 | 8 |

Date of Exposure: Mar. 23, 2009
Date of Inspection:
Day 1 Mar. 24, 2009
Day 2 Mar. 25, 2009
Day 4 Mar. 27, 2009
Day 8 Mar. 31, 2009
Day 14 Apr. 6, 2009
Day 185 Sep. 28, 2009
Scribe Corrosion Rating
0 Bright and clean
1 Staining no corrosion build up
2 Minor corrosion build up
3 Moderate corrosion build up
4 Major corrosion build up
5 Severe corrosion buildup
Scribe Blister/Undercutting Rating
0 No lifting of coating
1 Lifting or loss of adhesion up to $1/16$" (2 mm)
2 Lifting or loss of adhesion up to $1/8$" (3 mm)
3 Lifting or loss of adhesion up to $1/4$" (6 mm)
4 Lifting or loss of adhesion up to $1/2$" (13 mm)
5 Lifting or loss of adhesion beyond $1/2$" (>13 mm)
Panel Blister Size
ASTM D 714
10 None
8 Very small
6 Small
4 Medium
2 Large
*In this summary, the condition of the scribe was assessed as a function of the degree of corrosion products within the scribe, any blistering or edge creep along the scribe was noted, and finally the degree of blistering across the exposed (i.e., non-scribed) surfaces of the various panels. In most cases, the coating blisters or disbondment noted on these surfaces was confined to the edges of the panels. The edge blistering or disbondment occurred because the edge surfaces are not taped or otherwise protected from the environmental stresses (i.e., salt air, elevated temperatures, moisture ingress and UV-radiation) associated with a beachfront exposure site.

Discussion:

The physical testing results of the previous example showed that the primers containing ferrate (VI) had very good physical properties.

Table 4 shows the coating matrixes (stacking up of coating layers) of all twenty-two test metal panels. As shown by the above procedure, the first coating layer on the cleaned metal panels was either a chromate conversion coating (the MIL-C-5541 panels) or a thin adhesion film coating without any chromate (the PreKote panels). The second coating layer was a primer coating, which can be a chromate primer coating (MIL-PRF-23377), a strontium ferrate (VI) primer coating (Sample 11), a barium ferrate (VI) primer coating (Sample 12), or a barium sulfate control primer coating (barium sulfate—Sample 12—control). Table 3 showed the epoxy primer formulations (Samples 11-13) containing strontium ferrate (VI) (Samples 11), barium ferrate (VI) (Sample 12), and barium sulfate (Sample 13—control). The barium sulfate control primer coating contained no corrosion inhibitive at all (it will be called "the control primer" hereafter). The third coating layer was a top-coat, which contained no corrosion inhibiting additive.

Theoretically, the conversion coating provides both anti-corrosion property and promotes adhesion to enable the subsequent primer to adhere to the panel. Without the conversion coating, the cleaned panel must be treated to provide a film layer that would promote adhesion. Otherwise, the subsequent coating layer would not adhere to the treated metal panel. The top-coat can seal the coating and provide improved weatherability and additional corrosion protection without containing any corrosion inhibiting additive.

In the present example, the combination of Table 4 and Table 5 confirmed the corrosion resistance capability of each of eight coating matrixes. Metal panels coated with a completely non-chromate coating layers (the control panels 15 and 16) showed scribe corrosion at days 8, 14 and 185, lifting and loss of adhesion at days 8, 14, and 185 (see scribe blistering in Table 5), and small to medium panel blistering at day 14 and day 185. These two control panels demonstrated compromised corrosion resistance and coating adhesion, which was expected because these two panels contained no corrosion inhibition additive in their coating system stack-up.

On the other hand, the reference panel 2 containing a full chromate coating layers showed it scribe abrasion to be clean and bright without any corrosion or staining, demonstrating excellent corrosion resistance. The full chromate coating layers include a chromate conversion coating, a chromate primer coating, and a topcoat (see Table 4).

Likewise, the reference panels 12 and 13 exhibited good corrosion resistance and excellent edge creep resistance along the scribed area. The panels 12 and 13 as shown by Table 4) were first coated with non-chromate PreKote surface treatment followed by a chromate primer coating and a topcoat. The panel 13 showed a minor corrosion buildup at day 185, and no blistering around the scribe edges even at day 185. Both panels 12 and 13 presented no panel blistering at day 185.

Furthermore, similar to the visual inspection results of the panels 12 and 13, the panels 4-5 and 10-11 exhibited good corrosion resistance and excellent edge creep resistance along the scribed area. Although the panels 7 and 8 showed a slight scribe blistering at days 185, the other visual inspection results of panels 7 and 8 were similar to that of panels 4-5, 12-13, and 10-11. The panels 4 and 5 were first treated with a chromate conversion coating and then were coated with a control primer coating without any corrosion inhibition additive. The panels 7 and 8 had a coating matrix of a chromate conversion coating, a barium ferrate primer coating, and a topcoat. The panels 10 and 11 had a coating matrix of a chromate conversion coating, a strontium ferrate primer coating, and a topcoat.

Therefore, the results showed that ferrate primer coatings of the present invention were compatible with that of chromium conversion coating. Moreover, the ferrate primer coating can work with the chromium conversion coating in inhibiting corrosion for up to 185 days. Further, while not wishing to be bound by theory, it is presently believed that the initial staining inside of the scribe for the ferrate primer coated panels (panels 7-8, 10-11, 18-19, and 21-22) may represent the formation of the protective oxide layer by the ferrate(VI) ions.

Finally, the results of the panels 1-11, all of which had chromium conversion coating, confirmed that keeping hexavalent chromium in the corrosion resistant coating matrix is very beneficial. The results of panels 6-11 showed that the chromium can be limited to the conversion coating, and the ferrate primer coating can be applied to extend the corrosion inhibition capability of the chromium conversion coating. By applying non-chromium corrosion resistant primer coating to a chromium conversion coating, it eliminates the exposure to the hazardous hexavalent chromium during the stripping of paints for reapplication of coatings.

The panels 12-22 contained no corrosion resistant conversion coating. Moreover, as stated above, the control panels 15 and 16, without any corrosion inhibiting additive, showed significant scribe corrosion and blistering, and panel blistering starting at the eighth day.

In these panels without conversion coating protection, the panels coated with ferrate primer showed better corrosion resistance. The barium ferrate primer coated panels (panels 17-19) showed only slightly better corrosion resistance than that of the control panels 15 and 16. Interestingly, the strontium ferrate primer coated panels (panels 20-22) showed much better corrosion protection properties than that of the barium ferrate primer coated panels. Even more importantly, in the corrosion testing up to 185 days, one of the strontium ferrate primer coated panels, panel 22, performed comparably to the panels containing chromium in either conversion coating or primer (panels 4-13). Table 5 showed that the panel 22 did not develop any edge creep or blistering along the scribe area. Therefore, the above results showed that ferrate (VI)-containing primer can replace the chromium coating (both conversion and primer) in corrosion protection of the metal surface. Of course, more formulation optimization is preferred in order to consistently match the corrosion inhibiting capability of the ferrate (VI) compounds to that of the chromium compounds.

In conclusion, the present example demonstrated that the usefulness of the barium ferrate and strontium ferrate compounds as corrosion inhibiting additives in a primer formulation:

1. The addition of the power oxidative ferrate (VI) to the primer coating did not create any incompatibility problem in the application of the coating matrix to the aluminum alloy test panels. The expected incompatibility problems include preventing primer curing, interfering in the corrosion protection properties of the chromate coating, reducing adhesion of the primer to the metal surface, etc.
2. The ferrate (VI) containing primer coating can be used in a corrosion inhibiting coating matrix to reduce the chromate to the conversion only.
3. Within the test period of 185 days, the corrosion resistance and adhesion properties of the primer containing strontium ferrate were better than that of the primer containing barium ferrate.

While not wishing to be bound by theory, it is presently believed that comparing to strontium ferrate, the extreme low solubility of barium ferrate releases lesser amount of free ferrate (VI) ions to protect the metal surface from corrosion within 185 days. Due to. its relatively higher solubility, strontium ferrate is a better corrosion inhibiting additive for immediate corrosion protection. Nevertheless, barium ferrate might provide a longer lasting corrosion protection that might extends to several years. Therefore, if barium ferrate and strontium ferrate are combined in one primer coating, it might present the primer with both immediate corrosion resistance capability for months and extended corrosion resistance capability for years. Of course, other ferrate compounds with comparable or varying solubility can be used to fine-tune the corrosion inhibiting capability of ferrate-containing primers.

2. Examples of Surface Treatment with Ferrate (VI)

Example 3

This example illustrates the oxidative potential of $K_2FeO_4$ when it is combined with the PreKote® surface treatment material. It further illustrates the incompatibility of an aqueous $K_2FeO_4$ solution with a PreKote® surface treatment material.

Procedure: Add ~10 g of $K_2FeO_4$ crystals to a container with ~50 ml of a commercial-grade proprietary PreKote® material for surface treatment manufactured by Pantheon Chemical.

Results: A rapid oxidation of potassium ferrate ($K_2FeO_4$) was observed as evidenced by effervescence and a rapid change of color, from a distinct dark purple to a clear color change.

Discussion:

The result was expected based on the chemical composition of the PreKote® material and the reactivity of a ferrate (VI) compound. That is, as a power oxidative agent, the ferrate (VI) compound oxidized the organic components in the PreKote® material. Therefore, the ferrate (VI) solution cannot be combined directly with the PreKote® surface treatment material because the ferrate (VI) compound is not compatible with the PreKote® material in the presence of water. Other methods of combining with the PreKote® material should be explored.

Example 4

This example illustrates the corrosion resistance properties of ferrate (VI) in combination with PreKote® surface treatment material. It also shows that PreKote® material can be combined with a small amount of ferrate (VI) without being degraded.

Procedure and Result:
1. Added ~10 g of high purity potassium ferrate crystals to ~50 ml of de-aerated and deionized (DDI) water. The resulting solution turned to a deep dark purple color with little or no turbidity.
2. Transferred the solution of step 1 from a 100 ml glass beaker to a 2-inch diameter aluminum weighing tray.
3. Kept the solution of step 1 in the aluminum tray for ~2 minutes and then discard the solution. On the surface of the aluminum tray on which the solution of step 1 had contact, instead of a shiny aluminum silver color, a dull amber color was observed. This amber-colored film was not allowed to air dry.
4. Immediately after discarding the ferrate (VI) solution, sprayed the amber colored surface of the aluminum tray with a fine mist of PreKote surface treatment material. The PreKote surface treatment on the aluminum tray was lightly agitated for ~1 minute, and then rinsed with DDI water.
5. No visual disruption or dissolution of the amber film was observed after the processing of the PreKote surface treatment. This coating was then allowed to air dry for ~24 hours prior to being evaluated in an ASTM B 117 neutral salt fog chamber.
6. Conducted an exposure testing of the treated aluminum weighing tray (as shown above in steps 1-5) and a untreated control aluminum tray in an ASTM B117 approved chamber. The test period was ~48 hours.
7. At the end of the 48 hours, visually inspected the surfaces of two aluminum trays. The visual inspection of the "as-tested" surfaces of the treated and untreated trays confirmed a slight oxidation or discoloration of the untreated aluminum surfaces. On the other hand, no visual degradation or oxidation of the treated section on the surface of the treated tray was observed.

Discussion:

These results of this example suggest that the ferrate (VI)/PreKote film offers some level of corrosion protection to a bare aluminum alloy. Additional exposure testing is recommended to confirm and validate the long-term corrosion protection properties of this film.

Moreover, the example shows that the slight amount of ferrate(VI) ions left on the un-dried ferrate(VI) film did not oxidize the PreKote® material, or at least did not oxidize it significantly to be observed in the form of visual discoloration.

While not wishing to be bound by theory, it is presently believed that when the potassium ferrate (VI) aqueous solution was placed in contact with a metal surface (the surface of the aluminum tray), the ferrate(VI) reacts with the metal to form a protective oxidative film layer. This oxidative film layer was very stable. The PreKote material can be applied on top of this film without creating any problems observed in Example 3. Accordingly, the PreKote® material is compatible with the ferrate film coating on a metal surface, although the PreKote® material is incompatible with the aqueous ferrate(VI) solution as shown in Example 3.

3. Examples of Preparing Ferrate Compounds Suitable for Primer Formulation

Example 5

This example illustrates the synthesis of barium ferrate (VI) from the reaction of $Ba(OH)_2 \cdot 8H_2O$ and $K_2FeO_4$.

Procedure:
1. Added 0.2625 g $Ba(OH)_2 \cdot 8H_2O$ to 1.0 ml de-aerated, de-ionized (DDI) water. Stirred for a couple minutes until $Ba(OH)_2 \cdot H_2O$ dissolved into the DDI water.
2. Dissolved 0.2235 g $K_2FeO_4$ in 1.0 ml of DDI water.
3. Added the solution of step 1 to the $K_2FeO_4$ solution of step 2 drop-wise over a period of at least 3 minutes while stirring. An immediate formation of a very fine brick red precipitate was observed. $BaFeO_4$ has been frequently reported as being a brick red solid in the literature.
4. Stopped stirring once the red precipitate was observed. Allowed the mixture to stand for about four days (the dwell time), during which the precipitate settled to the bottom of the container and the supernatant became a clear and colorless solution.
5. Isolated the solid precipitate by decantation and DDI water washing, and then dried the precipitate in a vacuum desiccator over NaOH pellets.
6. An approximately 10% yield of $BaFeO_4$ was obtained from the above process. The isolated product was found to contain significant quantities of $BaCO_3$.

Discussion:

Only a 10% yield of $BaFeO_4$ was obtained from the process used in this example, even though 10% molar excess of $Ba(OH)_2$ was added to $K_2FeO_4$. Thus, the result showed that this process produced a hydration by-product or contaminate of $BaFeO_4$, reducing the yield of $BaFeO_4$. More washing and filtering might be needed to reduce the by-products in order to increase the yield of $BaFeO_4$.

While not wishing to be bound by theory, it is presently believed that the starting $Ba(OH)_2$ might contain a significant amount of residual $BaCO_3$. $BaCO_3$ is highly insoluble in water, especially in presence of excess $Ba^{2+}$ ions from $Ba(OH)_2$. Therefore, the residual $BaCO_3$ would most likely be co-precipitated the $BaFeO_4$ product.

Example 6

This example illustrates the synthesis and isolation of barium ferrate(VI) by reacting $Ba(OH)_2 \cdot 8H_2O$ with $K_2FeO_4$ in a relatively scaled size followed by additional rinsing with DDI water twice. A shorter dwell time is also used. Dwell time is defined as the period time allowed for the further reaction between $Ba(OH)_2 \cdot 8H_2O$ and $K_2FeO_4$ after adding $K_2FeO_4$ to $Ba(OH)_2 \cdot 8H_2O$ (see step 5).

Procedure:
1. Added 10.60 g $Ba(OH)_2 \cdot 8H_2O$ to 100 ml DDI water in a beaker, and stirred to dissolve $Ba(OH)_2 \cdot 8H_2O$ in DDI water with a magnetic stirrer.
2. Dissolved 9.99 g $K_2FeO_4$ in about 100 ml DDI water.
3. Added the $K_2FeO_4$ solution of step 2 drop-wise over a period of 8 minutes to the barium hydroxide solution of step 1 while stirring the barium hydroxide solution. Observed an immediate formation of brick red colored slurry.
4. Rinsed the addition funnel with about 20 ml DDI water.
5. Kept stirring the resulting mixture for about one hour.
6. Vacuum-filtered the mixture through a glass fiber filter until the retained solid was dry, forming a solid cake.

7. Rinsed the solid cake twice, first with 50 ml DDI water and then with a 20 ml DDI water. The filtrate was a colorless liquid, showing that ferrate(VI) ions were completely precipitated and so are not lost to the wash water. desiccator
8. Dried the rinsed solid cake in a vacuum desiccator over NaOH desiccant pellets. (Other desiccants, such as DriRite™ or plain vacuum, are expected to also be adequate for drying since $BaFeO_4$ is reported to be hygroscopic.) It took about one week to dry the solid cake (the isolated product) to a constant weight, producing a yield of 12.99 g dried product (about 99% mass yield based on theoretical calculation).
9. Characterized the resulting product by XRD (X-ray diffraction) and elemental analysis by ICAP (inductively coupled argon plasma). These two analytical methods are well known in the art. XRD analysis provides a selective identification of crystalline materials and compares the X-ray diffraction pattern with an extensive literature database. XRD of the resulting product showed that the resulting product was a mixture of $BaFeO_4$ and $BaCO_3$. The existence of $BaCO_3$ impurity resulted in a lower yield of barium ferrate(VI) relative to the amount calculated based on the isolated mass amount.

Discussion:

Although the resulting yield of the solid product was about 99%, which was based on mass yield of solid, the actual barium ferrate(VI) yield was much lower because of the existence of $BaCO_3$ impurity in the product. However, the yield of the final product was higher than that of Example 5 so the second washing and the much shorter standing time in the air (also called the dwell time) are believed to be helpful to achieve higher purity $BaFeO_4$ product. Additional improvements must be made to remove $BaCO_3$ from the resulting product to improve the yield of $BaFeO_4$, such as rinsing the reaction product more times with DDI water, starting with less carbonate content in the raw materials, working under a $CO_2$-free atmosphere, and adjust the pH of the potassium ferrate solution prior to mixing of the reagents. The pH adjustment is expected to prevent possible losses of ferrate(VI) by decomposition at neutral or lower pH.

Moreover, because the solutions were protected against long term contact from $CO_2$ from the atmosphere, and the process used DDI water, it is concluded that the source of the $BaCO_3$ was the original $Ba(OH)_2$ material. Hence, to achieve a high purity in the final $BaFeO_4$ product, then $CO_2$-free $Ba(OH)_2$ can be used. Alternatively, to remove $BaCO_3$ from the final BaFeO4 product, a non-basic Ba source can be used. However, this non-basic Ba source must be as soluble as in water as is $Ba(OH)_2$.

However, since carbonate solids are frequently used as filler materials in coating materials such as are primers, caulks, adhesives and paints, this $BaFeO_4/BaCO_3$ blended product would still be used for preparing corrosion control primers of the invention.

Example 7

This example illustrates the synthesis and isolation of barium ferrate(VI) from the reaction product of Ba$(OH)_2.8H_2O$ and $K_2FeO_4$, whose pH was pre-adjustment with a 2 wt % KOH solution.

Procedure:
1. Added 18.1 g $Ba(OH)_2.8H_2O$ to 800 ml DDI water in a beaker, and stirred to dissolve $Ba(OH)_2.H_2O$ in DDI water ($CO_2$ gas removed) with a magnetic stirrer for about 30 minutes. Filtered the $Ba(OH)_2$ solution through a fiber glass filter (FG filter) to produce a filtrate solution. This filtration step was performed to remove any possible $BaCO_3$ solid impurities. The finer this particulate is the finer the filter porosity needs to be. If the FG filter is too porous then Nylon filters are recommended. Such filtration porosities are available down to 0.02 microns. Normally 5-12 microns is sufficient, though 0.2 to 1.0 microns is also effective, just slower unless pressurized.
2. Prepared a basic 2 wt % KOH solution by dissolving 16.6 g of 85% KOH pellets in 800 ml DDI water.
3. Dissolved 5.35 g $K_2FeO_4$ (made by the Battelle Ferrate(VI) Process) in 200 ml 2 wt % KOH solution from Step 2, and then filtered the $K_2FeO_4$/KOH solution into the solution prepared in Step 1 while stirring the solution in the filtration flask; resulting the formation of a solid/liquid mixture. Continued stirring magnetically over a 10 minute period.
4. Observed an immediate formation of brick red precipitate in Step 3, indicating formation of the $BaFeO_4$ product. Continued to stir for 30 minutes, and then vacuum filtered through a FG filter. The resulting filtrate solution was a pale dusty rose color, indicating that little or no ferrate(VI) ion was lost to the filtrate, and that BaFeO4 has a very low solubility in water.
5. Washed the retained filtered product cake five times with 100 ml DDI water. Similar to the filtrate solution in step 4, the resulting solution from these washes were all essentially colorless.
6. Dried the rinsed solid cake in a vacuum desiccator over NaOH desiccant pellets as before. Although the drying used the NaOH pellets in the present example, the BaFeO4 product can be dried without using any NaOH pellets in a desiccator. The resulting product was dried to a constant weight of 5.23 g.
7. This isolated weight indicated a yield based on mass of 75.0% of theoretical amount.
8. XRD characterization of the dried product showed that the resulting product still had a significant amount of barium carbonate in addition to the desired product, $BaFeO_4$.

Discussion:

This procedure increased the yield of the final product comparing to the yield of Example 5. A visual qualitative comparison of XRD figures of the products from Examples 6 and 7 showed that the yield of the pure barium ferrate of the present example was higher than that of Example 7. However, a significant amount of barium carbonate still existed in the final product, reducing the yield of pure barium ferrate. Therefore, providing a basic condition for the ferrate solution improved the yield of BaFeO4 significantly, but there was still some carbonate ions entering the product from raw materials and the atmosphere.

More specifically, in this example, a basic 2 wt % KOH solution was used in step 2 to prevent premature ferrate(VI) decomposition by water oxidation in Step 3 by decreasing its oxidation potential, $E°$, to near or below that needed to oxidize water or hydroxide ion (as per the well known in the art Pourbaix Eh-pH diagrams). Unfortunately, this basic solution also efficiently absorbs $CO_2$ from the air to form $CO_3$, which then can form byproduct $BaCO_3$. Therefore, exposure to air should be minimized and/or the operation should be performed under $CO_2$-free air, $N_2$, Ar or He using well known techniques in the prior art.

Example 8

This example illustrates the synthesis and isolation of barium ferrate(VI) from the reaction product of very water soluble $BaCl_2.2H_2O$ and very water soluble $K_2FeO_4$ containing sufficient KOH to raise the reaction pH to >9, and preferably >11, and most preferably >13. This approach minimizes the amount of carbonate ion introduced via raw materials by using a highly soluble, non-basic barium salt as the barium ion source. Such materials do not absorb $CO_2$ from atmosphere or other sources over time as does $Ba(OH)_2.8H_2O$. The pH should still be adjusted basic to reduce the oxidation potential of ferrate(VI) ions to retard spontaneous decomposition of ferrate(VI) ions.

Procedure:
1. Added 10.0 g $BaCl_2.2H_2O$ to 150 ml DDI and Argon-purged water. Stirred to dissolve $BaCl_2.2H_2O$ at room temperature.
2. Dissolved 8.07 g $K_2FeO_4$ in 300 ml 2 wt % KOH water prepared in Example 7 step 2. The resulting 0.36M KOH solution has a pH of 13.6.
3. Added the Step $2K_2FeO_4$ solution to the Step 1 $BaCl_2.2H_2O$ solution drop-wise over a period of 15 minutes while stirring. The resulting solution contained 0.24M KOH, which had a pH of 13.4. Observed the formation of red brown powder in the mixture.
4. Continued to stir for about 3 hours at room temperature.
5. Filtered the mixture through a fiber glass filter paper as in previous examples. The resulting filtrate solution was colorless, indicating no $FeO_4^{2-}$ was lost in the filtrate.
6. Dried the retained product in vacuo at room temperature for about 3 to 5 days. The product was dried to a constant weight of 9.78 g, including the losses to the filter paper, resulting in a yield of 93.1% of theoretical yield based on recovered mass. XRD analysis confirmed the resulting product was barium ferrate(VI) of high purity.

Discussion:

This process improved the purity of the resulting barium ferrate product through the use of a non-basic barium chloride starting material, confirming all of the process improvements discussed above were of value in producing carbonate free, or at least low-carbonate, barium ferrate(VI). Moreover, it is theorized that the basic barium compound, such as barium hydroxide, readily absorbs $CO_2$ from air and then forms $BaCO_3$ which is insoluble in water.

Example 9

This example illustrates a scale-up of the process from Example 8 for synthesis and isolation of uncontaminated barium ferrate(VI) using the reaction product of $BaCl_2.2H_2O$ and $K_2FeO_4/KOH$.

Procedure:
1. Added 30.07 g of carbonate-free $BaCl_2.2H_2O$ to 350 ml DDI and argon-purged water. Stirred to dissolve $BaCl_2.2H_2O$ at room temperature.
2. With stirring, dissolved 24.40 $K_2FeO_4$ in 900 ml 2 wt % KOH water prepared in Example 7 Step 2.
3. Added the Step $2K_2FeO_4$ solution to the Step 1 $BaCl_2.2H_2O$ solution drop-wise over a period of 15 minutes while stirring. Observed the formation of red brown powder in the mixture, which was known to be $BaFeO_4$.
4. Continued to stir for about 3 hours at room temperature to insure complete ferrate(VI) ion precipitation as $BaFeO_4$ and to allow the average particle size to coarsen somewhat.
5. Filtered the mixture through a glass fiber filter paper. The resulting filtrate solution is colorless, indicating no $FeO_4^{2-}$ ions were lost in the filtrate.
6. Washed the filter cake twice with DDI water.
7. The product is dried in vacuo at room temperature for about 3 to 5 days. The product was dried to a constant weight of 30.58 g, including the losses to the filter paper, resulting in a mass recovery yield of 97.1% of theoretical yield. XRD analysis confirmed the resulting product was pure barium ferrate(VI) by comparison of the X-ray diffraction pattern to the large NIST data base.

Discussion:

The results show that the method of producing barium ferrate(VI) is robust enough to be scaled up to produce three times as much barium ferrate as in EXAMPLE 8. Interestingly, the yield of barium ferrate was even higher in a larger scale than that of the small laboratory scale in Example 8. It would be obvious to one skilled in the art of scaling up chemical production processes that the process of the present example would be scalable to a full commercial scale, which could be many thousands of pounds per day and tens of thousands of pounds per year.

Please note that the final drying time is not critical as long as it dries to less than 5% residual humidity as demonstrated by a constant weight of the final dried product. The primer application requires less than a 5% residual humidity, and preferably <1% relative humidity.

Example 10

This example illustrates the synthesis and isolation of strontium ferrate(VI) containing solid product from the reaction of $Sr(OH)_2.8H_2O$ and $K_2FeO_4$ in DDI water. Since $Sr(OH)_2.8H_2O$ is soluble in water, but is much less soluble than is barium hydroxide, it was necessary to develop a different synthesis procedure for the strontium ferrate(VI) containing solid product.

Procedure:
1. Added 14.83 g $Sr(OH)_2.8H_2O$ to 150 ml DDI water in a beaker, and stirred to dissolve $Sr(OH)_2.8H_2O$ in DDI water with a magnetic stirrer.
2. With mixing, dissolved 9.937 g $K_2FeO_4$ in about 125 ml DDI water. The $K_2FeO_4$ dissolved quickly with only minor swirling.
3. Added the $K_2FeO_4$ solution of Step 2 gradually over a period of 5 minutes to the strontium hydroxide solution of Step 1 while stirring vigorously.
4. Rinsed the mostly emptied $K_2FeO_4$ beaker with about 25 ml DDI water to wash off the residual ferrate and added to the mixture of step 3. No immediate change in either color or turbidity of the mixture was observed, indicating no immediate precipitation of a strontium ferrate(VI) containing solid product.
5. Kept stirring the resulting mixture for about 3 hours at room temperature (RT), during which a red brown precipitate formed. Continued stirring for another 1 hour until a deep red brown fine power developed.
6. Vacuum-filtered the resulting slurry of Step 6 through a FG filter (can be called as either fiber glass filter or glass fiber filter) to collect the solid precipitate from the slurry. The filtrate solution was a pale lavender color indicating some loss of ferrate(VI) ions to the filtrate and hence a loss in yield. On the filter paper, large colorless crystals of undissolved $Sr(OH)_2.8H_2O$ were observed along with the deep red brown ferrate product. Manually removed as many of large crystals as possible.
7. Dried the remaining solid on the filter paper in vacuo. The dried solid gave bubbles of $O_2$ immediately upon adding 6N HCl, suggesting a significant amount of strontium ferrate(VI) containing solid remained in the resulting solid product.

Discussion:

The results showed that although some strontium ferrate (VI) was produced from this procedure, it was contaminated with a significant amount $Sr(OH)_2.8H_2O$ as shown by the visual appearance of undissolved colorless crystals of the Sr(OH)$_2$.8H$_2$O. As the result, even though a 10% molar excess of Sr(OH)$_2$.8H$_2$O was used to react with K$_2$FeO$_4$, the yield of strontium ferrate(VI) was low as shown by a qualitative visual examination of the diagram from the XRD analysis of the resulting product. The yield was not quantified otherwise.

Example 11

This example illustrates an effort in removing Sr(OH)$_2$.8H$_2$O from the contaminated SrFeO$_4$ product of Example 10.
Procedure:
1. Re-suspended the contaminated yellow/red-brown SrFeO$_4$ of Example 10 in DDI water.
2. Stirred for about 72 hours.
3. Filtered the mixture through a glass fiber filter, resulting in a red brown solid cake on the filter paper.
4. Washed the cake twice with DDI water, and then dried to a constant weight in vacuo (needed 7 days drying time).
5. The above process produced 6.48 g strontium ferrate(VI) containing solid. Assuming the solid was 100% pure strontium ferrate(VI), this amount equated to a mass yield of about 62% theoretical amount.
6. Characterized the product by XRD and elemental analysis (EA).

Results and Discussion:
The XRD results showed a crystalline material that was not in the NIST database. The EA was performed by a commercial laboratory for K, Fe and Sr content by ICAP technique well known in the art (ICAP=Inductively Coupled Argon Plasma). The EA results were: Sample (Theory for SrFeO4): K<0.04% (0.00%); Fe 37.7% (26.9%); Sr 23.7(42.2%); 0 (by difference) 38.6% (30.9%). Therefore, the isolated strontium ferrate containing product was not merely of the formula SrFeO$_4$.

The XRD spectrum also showed three very broad major peaks. Such peaks are indicative of "amorphous" material also being presented, i.e. unorganized or nano-sized crystalline material. Most of times, the "amorphous" material indicates freshly precipitated metal hydroxides.

Moreover, the amount Fe found by EA was far greater than the theory value for SrFeO4, which suggested that the amorphous material is amorphous ferric oxyhydroxide, FeOOH, precipitate or other similar material. This material is often used as a paint and primer colorant. So the inclusion of this material might not detrimental to the intended use for the ferrate(VI) solid as a corrosion inhibiting additive in a primer coating. However, it is not certain whether or not FeOOH interferes with the function of the ferrate compound or reduces the compatibility of the ferrate compound with other ingredients of the primer. So a higher purity SrFeO$_4$ in a higher yield is preferred.

In addition, it would be desirable to eliminate or to reduce the extended washing of 72 hours from the production procedure. A lowering of the oxidation potential by increasing pH might enhance the precipitation of the SrFeO4 product while keeping the other metal salts in solution. As the result, a much reduced washing time would be needed.

In conclusion, the results showed that additional stirring, filtering, and washing together increased the yield of pure strontium ferrate to about 56% of the final solid product, although the final product produced was 62% of the theoretical yield. In other words, the pure strontium ferrate is about 35% of the theoretical yield. It is theorized that more time might be needed for the reaction of strontium hydroxide and potassium ferrate to achieve precipitation completion. As such, a longer reaction time was needed before filtering the mixture. In addition, KOH should be added in future experiments to reduce formation of FeOOH by increasing the pH of the reaction environment to at least 9 or above.

Example 12

This example illustrates an effort in removing excess Sr(OH)$_2$.8H$_2$O and other contaminates from the reaction product slurry of Sr(OH)$_2$.8H$_2$O with K$_2$FeO$_4$ in the presence of 2 wt % KOH solution. In addition, the slurry of the reaction product was diluted with additional water to dissolve out any excess solid Sr(OH)$_{2-8}$H$_2$O.
Procedure:
1. Added 15.05 g Sr(OH)$_2$.8H$_2$O to 150 ml DDI water in a beaker, and stirred to dissolve Sr(OH)$_2$.8H$_2$O in DDI water with a magnetic stirrer.
2. Dissolved 12.3 g K$_2$FeO$_4$ in about 125 ml 2 wt % KOH solution with stirring until totally dissolved.
3. Added the K$_2$FeO$_4$/KOH solution of step 2 gradually over a period of 20 minutes to the strontium hydroxide solution of step 1 while stirring.
4. Added additional 100 mL DDI water to the resulting mixture of step 3 in an attempt to dissolve any excess solid Sr(OH)$_2$.8H$_2$O.
5. Continued stirring for about 3 hour. A brown powdery substance and a pale purple supernatant were observed.
6. Let the mixture stand for 12 hours.
7. Filtered the resulting slurry of Step 6 through a glass fiber filter to collect the solid precipitate from the slurry. The filtrate solution was a light purple color, indicating some loss of ferrate(VI) ions to the filtrate solution. This loss might be reduced by lowering the temperature of the solutions.
8. Dried the solid precipitate product on the filter paper in a vacuum chamber over NaOH pellets.
9. The resulting strontium ferrate containing solid product weighed 7.986 g. Assuming the resulting isolated solid was 100% pure SrFeO$_4$, the process produced a 67.8% mass yield of theoretical yield amount.

Discussion:
This example produced a higher yield of strontium ferrate containing solid product. However, since neither XRD nor elemental analysis was performed on the final product, the purity of the final ferrate product was uncertain.

On the other hand, it was observed that the filtrate solution obtained was a light purple color, indicating that some SrFeO$_4$ may be presented in the filtrate solution. Since SrFeO$_4$ is somewhat soluble in water, it is unavoidable that some SrFeO$_4$ might be present in the filtrate solution. This effect was minimized in Example 13 below by pre-cooling the solutions and by incorporating of nonaqueous solvent washing(s).

Example 13

This example illustrates an effort in removing Sr(OH)$_2$.8H$_2$O contamination from the reaction production of SrCl$_2$, Sr(OH)$_2$.8F$_2$O and K$_2$FeO$_4$ in the presence of 2 wt % KOH solution. In this example, SrCl2 replaced most of Sr(OH)$_2$.8H$_2$O as the starting raw material.
Procedure:
1. Added 2 L of high purity deionized water to a 2 L flask. Boil the deionized water on a hot plate to remove the CO$_2$ to produce DDI water to use for this Example.

2. Cooled the DDI water from Step 1 in a refrigerator to cool the water to about 4° C.
3. Measured 14.99 g of $SrCl_2 \cdot 6H_2O$ and dissolve it in 30 ml cold de-aerated water of Step 2. Continued to stir the solution while maintaining the solution temperature at 4° C. by using a cooling jacketed beaker.
4. Added 30 ml of de-aerated water of Step 2 to a beaker. Stirred the water with a magnetic stir bar. Blowed argon over the surface of the liquid in the beaker.
5. Added $Sr(OH)_2 \cdot 8H_2O$ to the stirring de-aerated water until the solution is saturated. Filtered the solution through a glass fiber filter to remove any un-dissolved crystals.
6. Added the solution slowly with mixing to the $SrCl_2$-$6H_2O$ solution of Step 3 while maintaining the temperature of the mixture at 4° C.
7. Added 800 ml of the cold DDI water of Step 2 to a separate 1 L beaker along with a magnetic stir bar. Added 16.6 g of 88 wt % KOH pellets to the 1 L beaker. Stirred the mixture until all of the KOH pellets were dissolved, resulting in a 2 wt % KOH solution. The pH of the 2 wt % KOH solution was about 13.5. This pH was maintained throughout the rest of the procedure.
8. Cooled the 2 wt % KOH solution from Step 7 to 4° C.
9. To 45 ml of the 2 wt % KOH solution of Step 7, added 9.96 g (0.05029 mole) of $K_2FeO_4$ with mixing. Stirred the mixture until all of the $K_2FeO_4$ was dissolved.
10. Slowly added the resulting $K_2FeO_4$/KOH solution from Step 9 to the $Sr(OH)_{2-8}H_2O/SrCl_2 \cdot 6H_2O$ solution of Step 5 over a period of about 5 minutes.
11. Continued to stir the mixture for at least 30 minutes while maintaining the solution at 4° C. Observed black powder/solid in the mixture, indicating that solid strontium ferrate (VI) solid was formed during this mixing time.
12. Filtered the solution of Step 11 through a FG filter. The filtrate was a light purple solution. The retained product was a black solid.
13. Washed the retained black solid crystals with 50 ml of methanol at 4° C. to avoid dissolution losses of the ferrate (VI) product, and then immediately with 50 ml of ether at 4° C. to remove the methanol to prevent reduction of ferrate (VI) ions by residual methanol.
14. Immediately placed the isolated solid strontium ferrate (VI) material to dry in a 20 mm Hg vacuum desiccator over NaOH pellets for a period of about 3 to 5 days until the material was completely dried. NaOH pellets were used as desiccant to increase the rate of drying of the ferrate product.
15. The dried product weighed 6.58 g and was a tan powder. Theoretical for $SrFeO_4$ is 10.4 g giving a mass recovery yield of 63.1%.

Results:

XRD analysis of the product from Step 15 showed that it was almost 100% $SrFeO_4$. There were no detectable quantities of amorphous material present in the product.

EA (elemental analysis) of the product from Step 15 showed Actual Sample Analysis results (theory for $SrFeO_4$): Sr, 40.0% (42.23%); Fe, 25.0% (26.92%); K, 1.33% (0.00%); and O, 33:67% (30.85) %. These values of EA confirmed that the product produced was almost pure $SrFeO_4$.

Discussion:

The results from XRD and EA showed that the product produced was almost 100% pure $SrFeO_4$ with a small amount of K contamination (<0.1%). The small amount of K content was not expected to adversely affect the primer application performance.

The procedure from this Example is the most preferred process for preparation of anhydrous $SrFeO_4$. In fact, the material generated in this EXAMPLE was used in the primer tests reported in EXAMPLES 1 through 4.

In this case a highly soluble non-basic $Sr^{2+}$ salt was used in place of most or all of the $Sr(OH)_2 \cdot 8H_2O$ raw material. The 2 wt % KOH solution was again added to lower the oxidation potential of ferrate(VI) ions sufficiently to retard its oxidation of water. The highly soluble non-basic $Sr^{2+}$ salt should be the primary source of $Sr^{2+}$ (a preferred condition), or the sole source if $Sr(OH)_2 \cdot 8H_2O$ is eliminated entirely (the most preferred condition). While not wishing to be bound by theory, it is presently believed that the addition of the non-basic $Sr^{2+}$ salt ($SrCl_2$) enables a high concentration of $Sr^{2+}$ to be generated to depress the solubility of strontium ferrate(VI) in the product. At the same time, the low concentration of hydroxide ions (for example, ~1M at pH 9) prevents crystallization of $Sr(OH)_2 \cdot 8H_2O$ In addition, the cooling of the entire process was incorporated to reduce the losses of ferrate(VI) ion to the filtrate and wash solutions by making the final ferrate product more insoluble. The colder temperatures reduced the solubility of the desired strontium ferrate(VI) product. Colder temperatures also made $Sr(OH)_2 \cdot 8H_2O$ more soluble and therefore less likely to co-crystallize with the strontium ferrate(VI) product.

Finally, it should be noted that $Sr(OH)_2$ is an optional ingredient. More preferably, instead of $Sr(OH)_7$, a suitable amount of KOH pellets can be added to the $SrCl_2$ solution in Step 3 to insure the pH is above 9, preferably above 13. It is important that the amount of KOH added does not exceed the amount required to cause $Sr(OH)_2 \cdot 8H_2O$ crystallization under the cold conditions.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

The invention claimed is:
1. A corrosion resistant primer coating comprising
   a. one or more corrosion inhibiting additives comprising metal ferrate(IV) compounds, metal ferrate(V) compounds, metal ferrate(VI) compounds, or mixtures thereof; and
   b. one or more optional nonaqueous solvents, one or more optional filler additives, one or more optional curing agents; and
   c. one or more nonaqueous resins;
   wherein the corrosion inhibiting additives have a solubility in water in the range of about 0.001 ppm to about 2000 ppm at a temperature in the range of about 0° C. to 71° C.
2. The primer coating according to claim 1, wherein the corrosion inhibiting additive is a mixture of the metal ferrate (V) compound and the metal ferrate(VI) compound.
3. The primer coating according to claim 1, wherein the corrosion inhibiting additive is the metal ferrate(V) compound.
4. The primer coating according to claim 1, wherein the corrosion inhibiting additive is the metal ferrate(VI) compound.
5. The primer coating according to claim 1, wherein the metal of the metal ferrate compound comprises an alkali metal, alkaline earth metal, a transition metal, a group IIIA metal, a group IVA metal, a group VA metal, lanthanide metal, and a combination thereof; wherein the metal ferrate compound comprises metal ferrate(IV) compounds, metal ferrate(V) compounds, metal ferrate(VI) compounds, or mixtures thereof.

6. The primer coating according to claim 5, wherein the metal of the metal ferrate compound comprises Li, Na, K, Rb, Cs, Mg, Ca, Sr, Ba, Sc, Y, La, other lanthanide, Zn, Cd, Al, Ga, In, TI, Pb, Bi, or mixtures thereof; wherein the metal ferrate compound comprises metal ferrate(IV) compounds, metal ferrate(V) compounds, metal ferrate(VI) compounds, or mixtures thereof.

7. The primer coating according to claim 6, wherein the metal is Sr or Ba.

8. The primer coating according to claim 1, wherein the corrosion inhibiting additive has a solubility in water in the range of about 0.1 ppm to about 10 ppm at a temperature in the range of 0° C. to 712C.

9. The primer coating according to claim 1, wherein the metal ferrate compounds are encapsulated; wherein the metal ferrate compound comprises metal ferrate(IV) compounds, metal ferrate(V) compounds, metal ferrate(VI) compounds, or mixtures thereof.

10. The primer coating according to claim 1, wherein the ferrate ion of the metal ferrate compound is embedded in a solid solution with one or more compatible ions; wherein the metal ferrate compound comprises metal ferrate(IV) compounds, metal ferrate(V) compounds, metal ferrate(VI) compounds, or mixtures thereof.

11. The primer coating according to claim 1, wherein the nonaqueous resin comprises epoxy resin, alkyd, polyester, polyurethane, polyolefin, polyamide, polysulfide, polythioether, phenolic, urethane, polyvinyl, rosin esters, silicones, siloxanes, perfluorinated resin, other fluorinated resin, Teflon®, polyvinylidene difluoride, nylon, copolymers thereof, or mixtures thereof.

12. The primer coating according to claim 1, wherein the corrosion inhibiting additive is present at a range of about 0.01 wt % to about 25 wt %.

13. A method of making a corrosion resistant primer coating, comprising
    a. mixing one or more metal-1 salts, an alkali metal ferrate compound, a metal-2 hydroxide;, one or more optional additives, one or more optional nonaqueous solvent, one or more optional curing agent, and a nonaqueous resin; wherein one or more corrosion inhibiting additives containing one or more metal-1 ferrate compounds are formed; wherein the ferrate ion of the metal-1 ferrate compound is a ferrate(IV) ion, a ferrate(V) ion, a ferrate (VI) ion, or a mixture thereof; and
    b. blending the mixture of step a until the corrosion resistant primer coating is formed;
    wherein the metal-1 and the metal-2 are the same or are different from each other;
    wherein the corrosion inhibiting additive has a solubility range in water of about 0.001 ppm to about 2000 ppm at a temperature in the range of about 0° C. to 71  C.

14. The method according to claim 13, wherein the ferrate ion of the metal-1 ferrate compound is a mixture of the ferrate (V) ion and the ferrate(VI) ion.

15. The method according to claim 13, wherein the ferrate ion of the metal-1 ferrate compound is the ferrate(V) ion.

16. The method according to claim 13, wherein the ferrate ion of the metal-1 ferrate compound is the ferrate(VI) ion.

17. The method according to 13, wherein the metal-1 salt of step a has a solubility in water in the range of about 5 wt % to about 65 wt % at a temperature in the range of about 0° C. to about 71° C.

18. A method of making a corrosion resistant primer coating, comprising
    a. mixing one or more corrosion inhibiting additives, one or more optional filler additives, one or more optional nonaqueous solvents, one or more optional curing agents, and one or more nonaqueous resins, wherein the corrosion inhibiting additive comprises a metal ferrate(IV) compound, a metal ferrate(V) compound, a metal ferrate (VI) compound, or a mixture thereof; and
    b. blending the mixture of step a until the corrosion resistant primer coating is formed;
        wherein the corrosion inhibiting additives have a solubility in water in the range of about 0.001 ppm to about 2000 ppm at a temperature in the range of about 0° C. to 71° C.

19. The method according to claim 18, wherein the corrosion inhibiting additive is a mixture of the metal ferrate(V) compound and ferrate(VI) compound.

20. The method according to claim 18, wherein the corrosion inhibiting additive is the metal ferrate(V) compound.

21. The method according to claim 18, wherein the corrosion inhibiting additive is the metal ferrate(VI) compound.

22. The method according claim 18, further comprising a step a1 immediately before step a, wherein the step a1 comprises steps of
    i. providing the corrosion inhibiting additives in a first container, and providing one or more nonaqueous resins, one or more optional filler additives, one or more optional nonaqueous solvents, and one or more optional curing agents in one or more additional containers.

23. The method according to claim 18, wherein the step a further comprises steps of
    i. mixing the corrosion inhibiting additive, the optional filler additive, the optional solvent, the optional curing agent, and a first portion of the resin; and
    ii. mixing a second portion of the resin with the mixture of the step i.

24. A method for treating a metal surface for corrosion resistance, comprising
    a. preparing and treating the metal surface, comprising the steps of
        i. cleaning and deoxidizing the metal surface;
        ii. optionally rinsing the metal surface of step i with water; and
        iii. providing one or more adhesion promoting films on the cleaned and deoxidized metal surface;
    b. applying a corrosion resistant primer coating on the prepared metal surface, wherein the corrosion resistant primer coating comprises
        i. one or more corrosion inhibiting additives comprising metal ferrate(IV) compounds, metal ferrate(V) compounds, metal ferrate(VI) compounds, or mixtures thereof; wherein the corrosion inhibiting additives have a solubility in water in the range of about 0.001 ppm to about 2000 ppm at a temperature in the range of about 0° C. to 71° C.;
        ii. one or more optional filler additives;
        iii. one or more optional nonaqueous solvents;
        iv. one or more optional curing agents; and
        v. one or more nonaqueous resins.

25. The method according to claim 24, wherein the corrosion inhibiting additive is a mixture of the metal ferrate(V) compound and the metal ferrate(VI) compound.

26. The method according to claim 24, wherein the corrosion inhibiting additive is the metal ferrate(V) compound.

27. The method according to claim 24, wherein the corrosion inhibiting additive is the metal ferrate(VI) compound.

28. The method according to claim 24, wherein the adhesion promoting film is a surface treatment film and/or a conversion coating film.

29. The method according to claim 28, wherein step a(iii) provides two adhesion promoting films on the cleaned and deoxidized metal surface by the steps of
   a. applying the conversion coating film on the cleaned and deoxidized metal surface; and
   b. applying the surface treatment film on the conversion coated metal surface.

30. The method according to claim 24, further comprising applying a top-coat on the primer coated metal surface of step b.

31. The method according claim 24, wherein prior to applying the primer coating on the prepared metal surface of step a, step b further comprises steps of
   i. providing the corrosion inhibiting additives in a first container;
   ii. providing one or more nonaqueous resins, one or more optional filler additives, one or more optional nonaqueous solvents, and one or more optional curing agents in one or more additional containers; and
   iii. mixing the corrosion inhibitor with the ingredients of step ii.

* * * * *

UNITED STATES PATENT AND TRADEMARK OFFICE
CERTIFICATE OF CORRECTION

| | | |
|---|---|---|
| PATENT NO. | : 8,722,147 B2 | Page 1 of 1 |
| APPLICATION NO. | : 13/124702 | |
| DATED | : May 13, 2014 | |
| INVENTOR(S) | : Bruce F. Monzyk et al. | |

It is certified that error appears in the above-identified patent and that said Letters Patent is hereby corrected as shown below:

In the Claims

Column 39 under claim 8, line 16 delete "2" and insert --°-- after 71

Column 39 under claim 13(b), line 56, insert --°-- after 71

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,722,147 B2  
APPLICATION NO. : 13/124702  
DATED                 : May 13, 2014  
INVENTOR(S)      : Monzyk et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 135 days.

Signed and Sealed this

Twenty-ninth Day of September, 2015

Michelle K. Lee  
*Director of the United States Patent and Trademark Office*